United States Patent
Kim

(10) Patent No.: US 12,464,540 B2
(45) Date of Patent: Nov. 4, 2025

(54) METHOD AND DEVICE FOR TRANSMITTING LOCATION INFORMATION IN WIRELESS COMMUNICATION SYSTEM

(71) Applicant: LG ELECTRONICS INC., Seoul (KR)

(72) Inventor: Young Dae Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 462 days.

(21) Appl. No.: 17/922,950

(22) PCT Filed: May 6, 2021

(86) PCT No.: PCT/KR2021/005683
§ 371 (c)(1),
(2) Date: Mar. 2, 2023

(87) PCT Pub. No.: WO2021/225386
PCT Pub. Date: Nov. 11, 2021

(65) Prior Publication Data
US 2024/0292352 A1    Aug. 29, 2024

(30) Foreign Application Priority Data

May 6, 2020 (KR) .......... 10-2020-0053573
May 8, 2020 (KR) .......... 10-2020-0055369
Aug. 4, 2020 (KR) .......... 10-2020-0097300

(51) Int. Cl.
*H04W 72/25*    (2023.01)
*H04L 1/1812*   (2023.01)
(Continued)

(52) U.S. Cl.
CPC .......... *H04W 72/25* (2023.01); *H04W 4/02* (2013.01); *H04W 4/023* (2013.01);
(Continued)

(58) Field of Classification Search
CPC ....... H04W 4/02–029; H04W 56/0015; H04W 64/00–006; H04W 72/121; H04W 72/20;
(Continued)

(56) References Cited

U.S. PATENT DOCUMENTS 11,871,442 B2 *   1/2024  Wang ............... H04W 72/02
2016/0095092 A1 * 3/2016  Khoryaev .......... H04W 8/005
                                                  370/329
(Continued)

FOREIGN PATENT DOCUMENTS

CN    107295657 A    10/2017

OTHER PUBLICATIONS

"Summary of RAN1 Agreements/Working assumptions in W1 5G V2X with NR sidelink", LG Electronics, 3GPP TSG RAN WG1 #99, Reno, USA, Nov. 18-22, 2019, R1-1913601, pp. 1-42, (See section 5.6).

(Continued)

Primary Examiner — Brendan Y Higa
(74) Attorney, Agent, or Firm — BRYAN CAVE LEIGHTON PAISNER LLP

(57) ABSTRACT

The present disclose a method for delivering location information by a first terminal of a wireless communication system, the method comprising: delivering, by the first terminal, absolute location information during a process of performing link connection with a second terminal, wherein the absolute location information is information calculated based on a zone ID of the first terminal; setting a preset region based on the zone ID of the first terminal and assigning a zone index to each zone within the preset region; receiving, from the second terminal, relative location information corresponding to a location of the second terminal, wherein the relative location information is index information of a zone in which the second terminal is located based (Continued)

on the assigned zone index; and performing, by the first terminal and the second terminal, the link connection and performing sidelink communication.

15 Claims, 28 Drawing Sheets

(51) Int. Cl.
*H04W 4/02* (2018.01)
*H04W 4/40* (2018.01)
*H04W 56/00* (2009.01)
*H04W 64/00* (2009.01)
*H04W 72/40* (2023.01)
*H04W 76/14* (2018.01)
*H04W 92/18* (2009.01)

(52) U.S. Cl.
CPC ....... *H04W 56/0015* (2013.01); *H04W 64/00* (2013.01); *H04W 72/40* (2023.01); *H04W 76/14* (2018.02); *H04W 92/18* (2013.01); *H04L 1/1812* (2013.01); *H04W 4/40* (2018.02)

(58) Field of Classification Search
CPC ..... H04W 72/25; H04W 72/40; H04W 88/04; H04W 92/18; H04W 72/02; H04W 72/04; H04W 72/12; H04W 76/14; H04L 1/1812–1819
See application file for complete search history.

(56) References Cited

U.S. PATENT DOCUMENTS

| | | | |
|---|---|---|---|
| 2018/0042037 A1* | 2/2018 | Jin | H04W 72/121 |
| 2019/0068312 A1* | 2/2019 | Zhang | H04L 1/0033 |
| 2019/0239181 A1* | 8/2019 | Gangakhedkar | H04W 76/10 |
| 2020/0029318 A1* | 1/2020 | Guo | H04L 5/0055 |
| 2020/0077380 A1* | 3/2020 | Hahn | H04W 72/51 |
| 2020/0100048 A1* | 3/2020 | Wu | H04L 1/1829 |
| 2020/0106566 A1* | 4/2020 | Yeo | H04L 1/1854 |
| 2020/0178039 A1* | 6/2020 | Lee | H04L 1/1819 |
| 2020/0245389 A1* | 7/2020 | Mok | H04W 4/40 |
| 2020/0260214 A1* | 8/2020 | Wu | H04W 72/20 |
| 2020/0328861 A1* | 10/2020 | Malladi | H04L 5/0069 |
| 2021/0050954 A1* | 2/2021 | Ryu | H04W 76/14 |
| 2021/0068071 A1* | 3/2021 | Wu | G01S 19/51 |
| 2021/0075552 A1* | 3/2021 | Huang | H04L 1/1854 |
| 2021/0112375 A1* | 4/2021 | Lee | H04L 1/1819 |
| 2021/0203453 A1* | 7/2021 | Kim | H04L 5/0055 |
| 2021/0235420 A1* | 7/2021 | Kim | H04L 5/0092 |
| 2022/0141815 A1* | 5/2022 | Lee | H04L 1/1829 455/452.1 |
| 2022/0182967 A1* | 6/2022 | Yoshioka | H04W 64/003 |
| 2022/0201423 A1* | 6/2022 | Freda | H04W 64/003 |
| 2022/0214420 A1* | 7/2022 | Assouline | G08G 1/163 |
| 2022/0217497 A1* | 7/2022 | Ebrahim Rezagah | G01S 5/0205 |
| 2022/0217698 A1* | 7/2022 | Lee | H04W 4/40 |
| 2022/0264554 A1* | 8/2022 | Hui | H04W 72/20 |
| 2022/0393834 A1* | 12/2022 | Thomas | H04W 72/20 |
| 2023/0010676 A1* | 1/2023 | Wang | H04W 4/029 |
| 2023/0021929 A1* | 1/2023 | Bao | H04W 4/026 |
| 2023/0102142 A1* | 3/2023 | Kim | H04W 72/1263 370/329 |
| 2023/0319855 A1* | 10/2023 | Park | H04L 5/0053 370/330 |
| 2023/0328695 A1* | 10/2023 | Zhang | H04W 4/40 370/329 |
| 2023/0345409 A1* | 10/2023 | Si | G01S 5/0009 |

OTHER PUBLICATIONS

"3rd Generation Partnership Project; Technical Specification Group Radio Access Network; NR; Radio Resource Control (RRC) protocol specification (Release 16)", 3GPP TS 38.331 V16.0.0 (Mar. 2020), pp. 1-837, (See sections 5.8.1 and 5.8.11).
"Discussion on zone configurations in RRC for NR V2X", Apple, 3GPP TSG-RAN WG2 e-Meeting #109, Feb. 24-Mar. 6, 2020, R2-2000611, pp. 1-6, (See section 2).
"NR V2X Zone ID", Qualcomm, 3GPP TSG RAN WG2 #109e, E-meeting, Feb. 24-28, Mar. 2-6, 2020, R2-2001517, pp. 1-4, (See section discussion: and proposal).

* cited by examiner

FIG. 8

| ... | 127 | 64 | 65 | 66 | 67 | 68 | 69 | 70 | 71 | 72 | 73 | 74 | ... | 127 | 64 | 65 | 66 | 67 | 68 | 69 | 70 | 71 | 72 | 73 | 74 | ... | 127 | 64 |
|---|---|---|---|---|---|---|---|---|---|---|---|---|---|---|---|---|---|---|---|---|---|---|---|---|---|---|---|
| ... | 63 | 0 | 1 | 2 | 3 | 4 | 5 | 6 | 7 | 8 | 9 | 10 | ... | 63 | 0 | 1 | 2 | 3 | 4 | 5 | 6 | 7 | 8 | 9 | 10 | ... | 63 | 0 |
| ... | 4095 | 4032 | 4033 | 4034 | 4035 | 4036 | 4037 | 4038 | 4039 | 4040 | 4041 | 4042 | ... | 4095 | 4032 | 4033 | 4034 | 4035 | 4036 | 4037 | 4038 | 4039 | 4040 | 4041 | 4042 | ... | 4095 | 4032 |
| ... | 703 | 640 | 641 | 642 | 4035 | 4036 | 4037 | 4038 | 4039 | 4040 | 4041 | 4042 | ... | 703 | 640 | 641 | 642 | 4035 | 4036 | 4037 | 4038 | 4039 | 4040 | 4041 | 4042 | ... | | |
| ... | 639 | 576 | 577 | 578 | 579 | 580 | 581 | 582 | 583 | 584 | 585 | 586 | ... | 639 | 576 | 577 | 578 | 579 | 580 | 581 | 582 | 583 | 584 | 585 | 586 | ... | | |
| ... | 575 | 512 | 513 | 514 | 515 | 516 | 517 | 518 | 519 | 520 | 521 | 522 | ... | 575 | 512 | 513 | 514 | 515 | 516 | 517 | 518 | 519 | 520 | 521 | 522 | ... | | |
| ... | 511 | 448 | 449 | 450 | 451 | 452 | 453 | 454 | 455 | 456 | 457 | 458 | ... | 511 | 448 | 449 | 450 | 451 | 452 | 453 | 454 | 455 | 456 | 457 | 458 | ... | | |
| ... | 447 | 384 | 385 | 386 | 387 | 388 | 389 | 390 | 391 | 392 | 393 | 394 | ... | 447 | 384 | 385 | 386 | 387 | 388 | 389 | 390 | 391 | 392 | 393 | 394 | ... | | |
| ... | 383 | 320 | 321 | 322 | 323 | 324 | 325 | 326 | 327 | 328 | 329 | 330 | ... | 383 | 320 | 321 | 322 | 323 | 324 | 325 | 326 | 327 | 328 | 329 | 330 | ... | | |
| ... | 319 | 256 | 257 | 258 | 259 | 260 | 261 | 262 | 263 | 264 | 265 | 266 | ... | 319 | 256 | 257 | 258 | 259 | 260 | 261 | 262 | 263 | 264 | 265 | 266 | ... | | |
| ... | 255 | 192 | 193 | 194 | 195 | 196 | 197 | 198 | 199 | 200 | 201 | 202 | ... | 255 | 192 | 193 | 194 | 195 | 196 | 197 | 198 | 199 | 200 | 201 | 202 | ... | | |
| ... | 191 | 128 | 129 | 130 | 131 | 132 | 133 | 134 | 135 | 136 | 137 | 138 | ... | 191 | 128 | 129 | 130 | 131 | 132 | 133 | 134 | 135 | 136 | 137 | 138 | ... | | |
| ... | 127 | 64 | 65 | 66 | 67 | 68 | 69 | 70 | 71 | 72 | 73 | 74 | ... | 127 | 64 | 65 | 66 | 67 | 68 | 69 | 70 | 71 | 72 | 73 | 74 | ... | | |
| ... | 63 | 0 | 1 | 2 | 3 | 4 | 5 | 6 | 7 | 8 | 9 | 10 | ... | 63 | 0 | 1 | 2 | 3 | 4 | 5 | 6 | 7 | 8 | 9 | 10 | ... | | |
| ... | 4095 | 4032 | 4033 | 4034 | 4035 | 4036 | 4037 | 4038 | 4039 | 4040 | 4041 | 4042 | ... | 4095 | 4032 | 4033 | 4034 | 4035 | 4036 | 4037 | 4038 | 4039 | 4040 | 4041 | 4042 | ... | | |
| ... | ... | ... | ... | ... | ... | ... | ... | ... | ... | ... | ... | ... | ... | ... | ... | ... | ... | ... | ... | ... | ... | ... | ... | ... | ... | ... | | |

| 4032 | 4033 | 4034 | 4035 | 4036 | 4037 | 4038 | 4039 | 4040 | 4041 | 4042 | ... | 4095 |
|---|---|---|---|---|---|---|---|---|---|---|---|---|
| ... | ... | ... | ... | ... | ... | ... | ... | ... | ... | ... | ... | ... |
| 640 | 641 | 642 | 4035 | 4036 | 4037 | 4038 | 4039 | 4040 | 4041 | 4042 | ... | 703 |
| 576 | 577 | 578 | 579 | 580 | 581 | 582 | 583 | 584 | 585 | 586 | ... | 639 |
| 512 | 513 | 514 | 515 | 516 | 517 | 518 | 519 | 520 | 521 | 522 | ... | 575 |
| 448 | 449 | 450 | 451 | 452 | 453 | 454 | 455 | 456 | 457 | 458 | ... | 511 |
| 384 | 385 | 386 | 387 | 388 | 389 | 390 | 391 | 392 | 393 | 394 | ... | 447 |
| 320 | 321 | 322 | 323 | 324 | 325 | 326 | 327 | 328 | 329 | 330 | ... | 383 |
| 256 | 257 | 258 | 259 | 260 | 261 | 262 | 263 | 264 | 265 | 266 | ... | 319 |
| 192 | 193 | 194 | 195 | 196 | 197 | 198 | 199 | 200 | 201 | 202 | ... | 255 |
| 128 | 129 | 130 | 131 | 132 | 133 | 134 | 135 | 136 | 137 | 138 | ... | 191 |
| 64 | 65 | 66 | 67 | 68 | 69 | 70 | 71 | 72 | 73 | 74 | ... | 127 |
| 0 | 1 | 2 | 3 | 4 | 5 | 6 | 7 | 8 | 9 | 10 | ... | 63 |

FIG. 13C

| 4032 | 4033 | 4034 | 4035 | 4036 | 4037 | 4038 | 4039 | 4040 | 4041 | 4042 | ... | 4095 |
|------|------|------|------|------|------|------|------|------|------|------|-----|------|
| ... | ... | ... | ... | ... | ... | ... | ... | ... | ... | ... | ... | ... |
| 640 | 641 | 642 | 4035 | 4036 | 4037 | 4038 | 4039 | 4040 | 4041 | 4042 | ... | 703 |
| 576 | 577 | 578 | 579 | 580 | 581 | 582 | 583 | 584 | 585 | 586 | ... | 639 |
| 512 | 513 | 514 | 515 | 516 | 517 | 518 | 519 | 520 | 521 | 522 | ... | 575 |
| 448 | 449 | 450 | 451 | 452 | 453 | 454 | 455 | 456 | 457 | 458 | ... | 511 |
| 384 | 385 | 386 | 387 | 388 | 389 | 390 | 391 | 392 | 393 | 394 | ... | 447 |
| 320 | 321 | 322 | 323 | 324 | 325 | 326 | 327 | 328 | 329 | 330 | ... | 383 |
| 256 | 257 | 258 | 259 | 260 | 261 | 262 | 263 | 264 | 265 | 266 | ... | 319 |
| 192 | 193 | 194 | 195 | 196 | 197 | 198 | 199 | 200 | 201 | 202 | ... | 255 |
| 128 | 129 | 130 | 131 | 132 | 133 | 134 | 135 | 136 | 137 | 138 | ... | 191 |
| 64 | 65 | 66 | 67 | 68 | 69 | 70 | 71 | 72 | 73 | 74 | ... | 127 |
| 0 | 1 | 2 | 3 | 4 | 5 | 6 | 7 | 8 | 9 | 10 | ... | 63 |

| 1 | 2 | 3 | 4 | 5 |
|---|---|---|---|---|
| 6 | 7 | 8 | 9 | 10 |
| 11 | 12 | 13 | 14 | 15 |
| 16 | 17 | 18 | 19 | 20 |
| 21 | 22 | 23 | 24 | 25 |

METHOD AND DEVICE FOR TRANSMITTING LOCATION INFORMATION IN WIRELESS COMMUNICATION SYSTEM

CROSS REFERENCE TO RELATED APPLICATION

This application is a National Stage filing under 35 U.S.C. 371 of International Application No. PCT/KR2021/005683, filed May 6, 2021, which claims the benefit of Korean Application No. 10-2020-0053573, filed May 6, 2020, Korean Application No. 10-2020-0055369, filed May 8, 2020 and Korean Application No. 10-2020-0097300, filed Aug. 4, 2020 the entire contents of which are incorporated herein for all purposes by this reference.

TECHNICAL FIELD

The present disclosure relates to a wireless communication system, and more particularly, to a method and apparatus for transmitting location information in a wireless communication system.

Especially, the present disclosure relates to a method and apparatus for delivering location information between terminals in sidelink (SL) communication.

BACKGROUND

A wireless communication system is a multiple access system that supports communication of multiple users by sharing available system resources (e.g., a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (mMTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

The present disclosure relates to a method and apparatus for transmitting location information in a wireless communication system.

The present disclosure relates to a method for using a zone ID and a block ID to identify location information between terminals in sidelink communication of a wireless communication system.

The present disclosure relates to a method for using absolute location information and relative location information to deliver location information between terminals in sidelink communication of a wireless communication system.

The present disclosure relates to a method for performing synchronization in sidelink communication in a wireless communication system.

The technical objects to be achieved in the present disclosure are not limited to the above-mentioned technical objects, and other technical objects that are not mentioned may be considered by those skilled in the art through the embodiments described below.

The present disclosure a method for delivering location information by a first terminal of a wireless communication system, the method comprising: delivering, by the first terminal, absolute location information during a process of performing link connection with a second terminal, wherein the absolute location information is information calculated based on a zone ID of the first terminal; setting a preset region based on the zone ID of the first terminal and assigning a zone index to each zone within the preset region; receiving, from the second terminal, relative location information corresponding to a location of the second terminal, wherein the relative location information is index information of a zone in which the second terminal is located based on the assigned zone index; and performing, by the first terminal and the second terminal, the link connection and performing sidelink communication.

The present disclosure a method for delivering location information of a first terminal of a wireless communication system, the method comprising: receiving, by the first terminal, absolute location information during a process of performing link connection with a second terminal, wherein the absolute location information is information calculated based on a zone ID of the second terminal; setting a preset region based on the zone ID of the second terminal and assigning a zone index to each zone within the preset region; transmitting, to the second terminal, relative location information corresponding to a location of the first terminal, wherein the relative location information is index information of a zone in which the first terminal is located based on the assigned zone index; and performing, by the first terminal and the second terminal, the link connection and performing sidelink communication.

The present disclosure a terminal delivering location information in a wireless communication system, the terminal comprising: a transceiver; and a processor coupled with the transceiver, wherein the processor is configured to: deliver absolute location information while the terminal performs link connection with another terminal, wherein the absolute location information is information that is calculated based on a zone ID of the terminal, set a preset region based on the zone ID of the terminal and assign a zone index to each zone within the preset region, receive, from the another terminal, relative location information corresponding to a location of the another terminal, wherein the relative location information is index information of a zone in which the another terminal is located based on the assigned zone index, and perform the link connection between the terminal and the another terminal and perform sidelink communication.

The present disclosure a terminal delivering location information in a wireless communication system, the terminal comprising: a transceiver; and a processor coupled with the transceiver, wherein the processor is configured to: receive absolute location information while the terminal performs link connection with another terminal, wherein the absolute location information is information that is calculated based on a zone ID of the another terminal, set a preset region based on the zone ID of the another terminal and assign a zone index to each zone within the preset region, transmit, to the another terminal, relative location information corresponding to a location of the terminal, wherein the relative location information is index information of a zone in which the another terminal is located based on the assigned zone index, and perform the link connection between the terminal and the another terminal and perform sidelink communication.

The present disclosure a device comprising at least one memory and at least one processor functionally coupled with the at least one memory, wherein the at least one processor is configured to: deliver absolute location information while the device performs link connection with another device, wherein the absolute location information is information that is calculated based on a zone ID of the device, set a preset region based on the zone ID of the device and assign a zone index to each zone within the preset region, receive, from the another device, relative location information corresponding to a location of the another device, wherein the relative location information is index information of a zone in which the another device is located based on the assigned zone index, and perform the link connection between the device and the another device and perform sidelink communication.

The present disclosure a non-transitory computer-readable medium storing at least one instruction, comprising the at least one instruction that is executable by a processor, wherein the at least one instruction instructs the processor to: deliver absolute location information while a device performs link connection with another device, wherein the absolute location information is information that is calculated based on a zone ID of the device, set a preset region based on the zone ID of the device and assign a zone index to each zone within the preset region, receive, from the another device, relative location information corresponding to a location of the another device, wherein the relative location information is index information of a zone in which the another device is located based on the assigned zone index, and perform the link connection between the device and the another device and perform sidelink communication.

In addition, the following may be commonly applied.

The present disclosure based on a change in a location of the first terminal, the first terminal sets the preset region based on the zone ID of the first terminal at a time of transmitting the absolute location information to the second terminal, assigns the zone index, and transmits index information of a zone corresponding to a changed location of the first terminal to the second terminal.

The present disclosure based on a change in the location of the second terminal, the second terminal sets a preset region based on the location of the second terminal at a time of transmitting the relative location information to the first terminal, assigns a zone index to each zone within the preset region, and transmits, to the first terminal, index information of a zone, which corresponds to a changed location of the second terminal, as relative location information.

The present disclosure a size of the preset region is determined based on at least one of a channel environment and a travel speed of the first terminal and the second terminal.

The present disclosure based on the location of the second terminal being within the preset region, the relative location information is transmitted to the first terminal, and wherein, based on the location of the second terminal being outside the preset region, the second terminal transmits absolute location information based on a zone ID of the second terminal to the first terminal.

The present disclosure a format of the absolute location information and a format of the relative location information are set to be the same, and wherein the format includes an indicator for identifying the absolute location information and the relative location information.

The present disclosure the format of the absolute location information and the format of the relative location information are set to be different, and wherein the absolute location information is transmitted based on sidelink control information (SCI) and the relative location information is transmitted based on a medium access control (MAC) control element (CE).

The present disclosure each of the first terminal and the second terminal transmits relative location information to another terminal based on information on a changed location at a time when a location is changed.

The present disclosure relative location information of the first terminal, which is based on a changed location of the first terminal, and relative location information of the second terminal, which is based on a changed location of the second terminal, are transmitted to another terminal based on a preset cycle.

The present disclosure the absolute location information and the relative location information are configured by 12 bits, wherein the relative location information includes a bit based on a zone index and a reserved bit, and wherein a zone sub-index is allocated to the reserved bit.

The present disclosure the absolute location information further includes a block ID.

The present disclosure the block ID is determined based on a size of a block for which the zone ID is configured, wherein, based on the size of the block being smaller than a first threshold, the block ID is configured by 3 bits, wherein, based on the size of the block being larger than the first threshold and smaller than a second threshold, the block ID is configured by 2 bits, and wherein, based on the size of the block being larger than the second threshold, the block ID is disabled.

The present disclosure the absolute location information further includes a zone ID and a sub-zone ID indicating information located within a zone corresponding to the zone ID.

The following effects may be produced by embodiments based on the present disclosure.

According to the present disclosure, it is possible to provide a method for transmitting location information in a wireless communication system.

According to the present disclosure, it is possible to provide a method for using a zone ID and a block ID to identify location information between terminals in sidelink communication of a wireless communication system.

According to the present disclosure, it is possible to provide a method for using absolute location information and relative location information to deliver location information between terminals in sidelink communication of a wireless communication system.

According to the present disclosure, it is possible to provide a method for performing synchronization in sidelink communication in a wireless communication system.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure.

That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

FIG. 8 is a view showing a zone ID according to an embodiment of the present disclosure.

FIG. 9 is a view showing a method of distinguishing zone IDs according to an embodiment of the present disclosure.

FIG. 10 is a view showing a zone ID and a block ID according to an embodiment of the present disclosure.

FIG. 12 is a view showing a sub-zone ID according to an embodiment of the present disclosure.

FIG. 13A is a view showing a method for exchanging location information between terminals according to an embodiment of the present disclosure.

FIG. 13C is a view showing a method for exchanging location information between terminals according to an embodiment of the present disclosure.

FIG. 13D is a view showing a method for exchanging location information between terminals according to an embodiment of the present disclosure.

FIG. 15 is a view showing a method for configuring a zone ID of a base station according to an embodiment of the present disclosure.

DETAILED DESCRIPTION OF THE INVENTION

Figure 1:
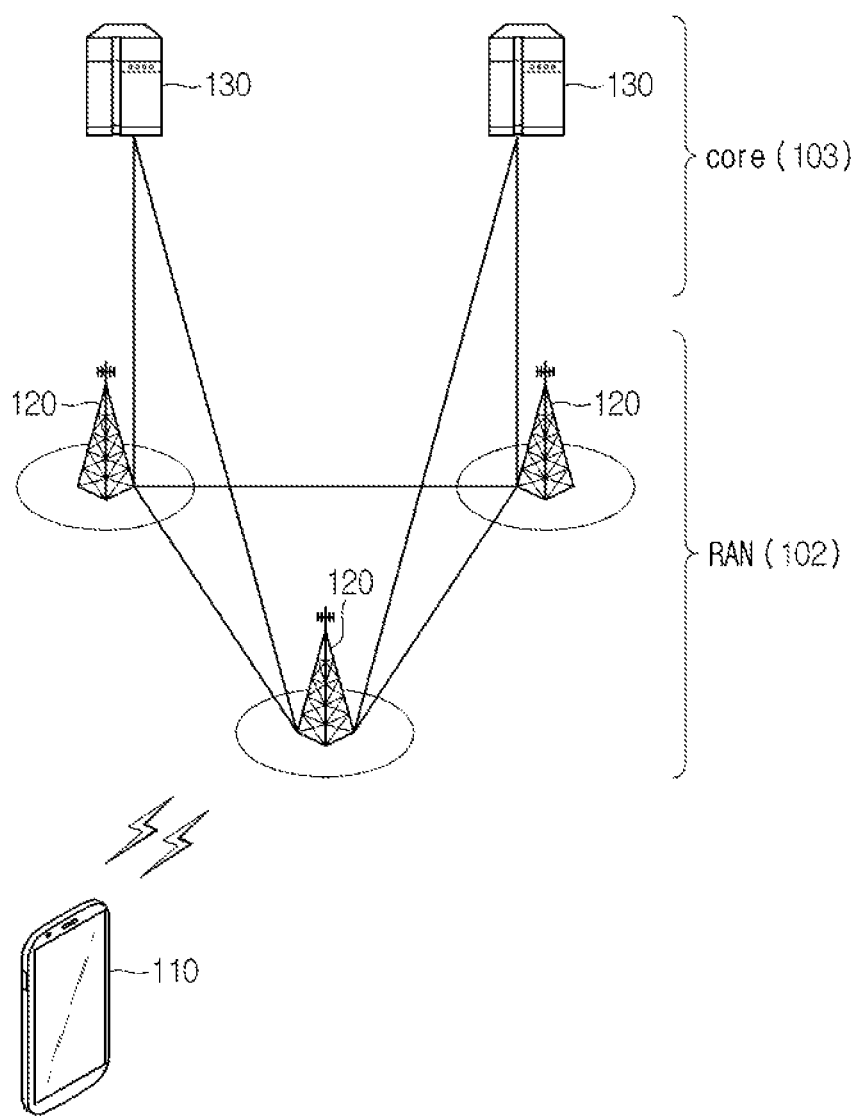
FIG. 1 illustrates a structure of a wireless communication system according to an embodiment of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information"

In the following description, 'when, if, in case of' may be replaced with 'on the basis of/based on'.

A technical feature described individually in one figure in the present specification may be individually implemented, or may be simultaneously implemented.

In this specification, a higher layer parameter may be set for a terminal, set in advance, or predefined. For example, a base station or a network may transmit a higher layer parameter to a terminal. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in this specification, reference may be made to a wireless communication standard documents (3GPP TS36.XXX, 3GPP TS37.XXX and 3GPP TS38.XXX) published before this specification is filed. For example, the following document may be referred to.

Communication System to which the Present Disclosure is Applicable

FIG. 1 illustrates a structure of a wireless communication system according to an embodiment of the present disclosure. The embodiment of FIG. 1 may be combined with various embodiments of the present disclosure.

Referring to FIG. 1, the wireless communication system includes a radio access network (RAN) 102 and a core network 103. The radio access network 102 includes a base station 120 that provides a control plane and a user plane to a terminal 110. The terminal 110 may be fixed or mobile, and may be called a user equipment (UE), a mobile station (MS), a subscriber station (SS), a mobile subscriber station (MSS), a mobile terminal, an advanced mobile station (AMS), or a wireless device. The base station 120 refers to a node that provides a radio access service to the terminal 110, and may be called a fixed station, a Node B, an eNB (eNode B), a gNB (gNode B), an ng-eNB, an advanced base station (ABS) or an access point, a base transceiver system (BTS), or an access point (AP). The core network 103 includes a core network entity 130. The core network entity 130 may be defined in various ways according to functions, and may be called other terms such as a core network node, a network node, and a network equipment.

Components of a system may be referred to differently according to an applied system standard. In the case of LTE or LTE-A standard, the radio access network 102 may be referred to as an Evolved-UMTS Terrestrial Radio Access Network (E-UTRAN), and the core network 103 may be referred to as an evolved packet core (EPC). In this case, the core network 103 includes a Mobility Management Entity (MME), a Serving Gateway (S-GW), and a packet data network-gateway (P-GW). The MME has access information of a terminal or information on the capability of the terminal, and this information is mainly used for mobility management of the terminal. The S-GW is a gateway having an E-UTRAN as an endpoint, and the P-GW is a gateway having a packet data network (PDN) as an endpoint.

In the case of 5G NR standard, the radio access network 102 may be referred to as NG-RAN, and the core network 103 may be referred to as 5GC (5G core). In this case, the core network 103 includes an access and mobility management function (AMF), a user plane function (UPF), and a session management function (SMF). The AMF provides a function for access and mobility management in units of terminals, the UPF performs a function of mutually transferring data units between an upper data network and the radio access network 102, and the SMF provides a session management function.

The BSs 120 may be connected to one another via Xn interface. The BS 120 may be connected to one another via core network 103 and NG interface. More specifically, the BSs 130 may be connected to an access and mobility management function (AMF) via NG-C interface, and may be connected to a user plane function (UPF) via NG-U interface.

Figure 2:
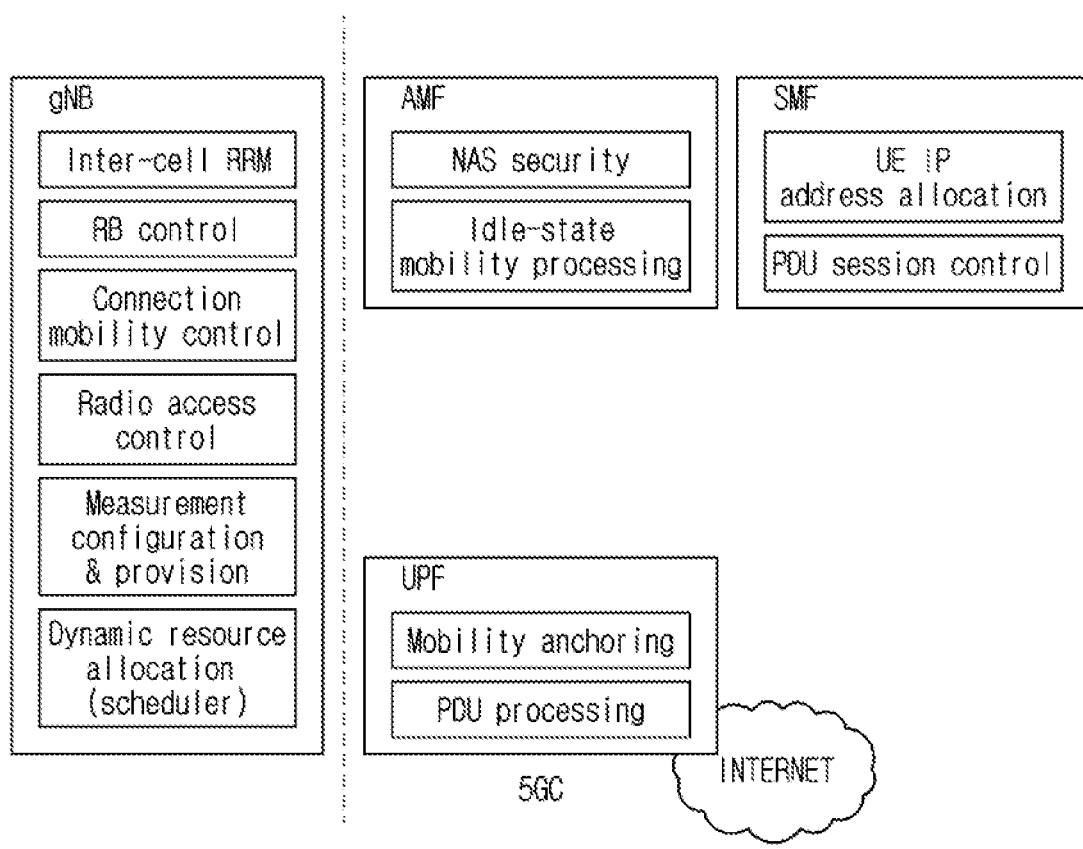
FIG. 2 illustrates functional division between NG-RAN and 5GC according to an embodiment of the present disclosure.

FIG. 2 illustrates a functional division between an NG-RAN and a 5GC applicable to the present disclosure. The embodiment of FIG. 2 may be combined with various embodiments of the present disclosure.

Referring to FIG. 2, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer enable to exchange an RRC message between the UE and the BS.

V2X or Sidelink Communication

Figure 3A:
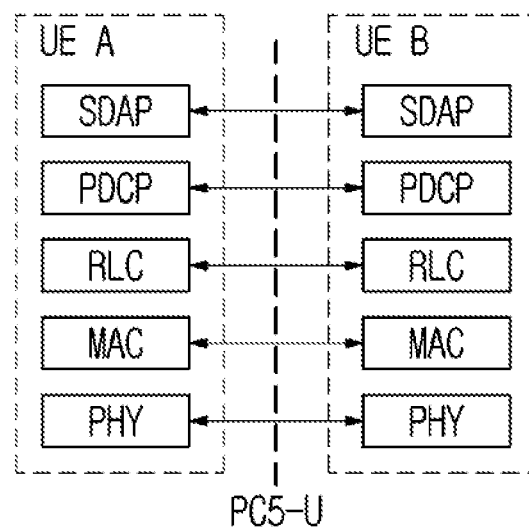
FIG. 3A and FIG. 3B illustrate a radio protocol architecture for SL communication according to an embodiment of the present disclosure.
Figure 3B:
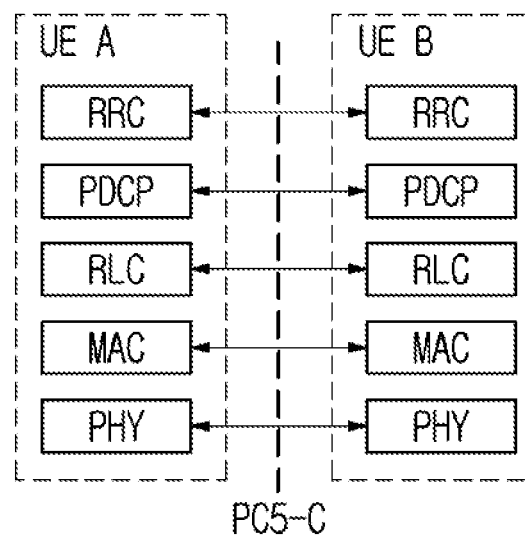

FIGS. 3A and 3B illustrate a radio protocol architecture applicable to the present disclosure. The embodiment of FIG. 3 may be combined with various embodiments of the present disclosure. Specifically, FIG. 3A exemplifies a radio protocol architecture for a user plane, and FIG. 3B exemplifies a radio protocol architecture for a control plane. The user plane corresponds to a protocol stack for user data transmission, and the control plane corresponds to a protocol stack for control signal transmission.

The SLSS may include a primary sidelink synchronization signal (PSSS) and a secondary sidelink synchronization signal (SSSS), as an SL-specific sequence.

The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization Synchronization Acquisition of SL Terminal In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 4:
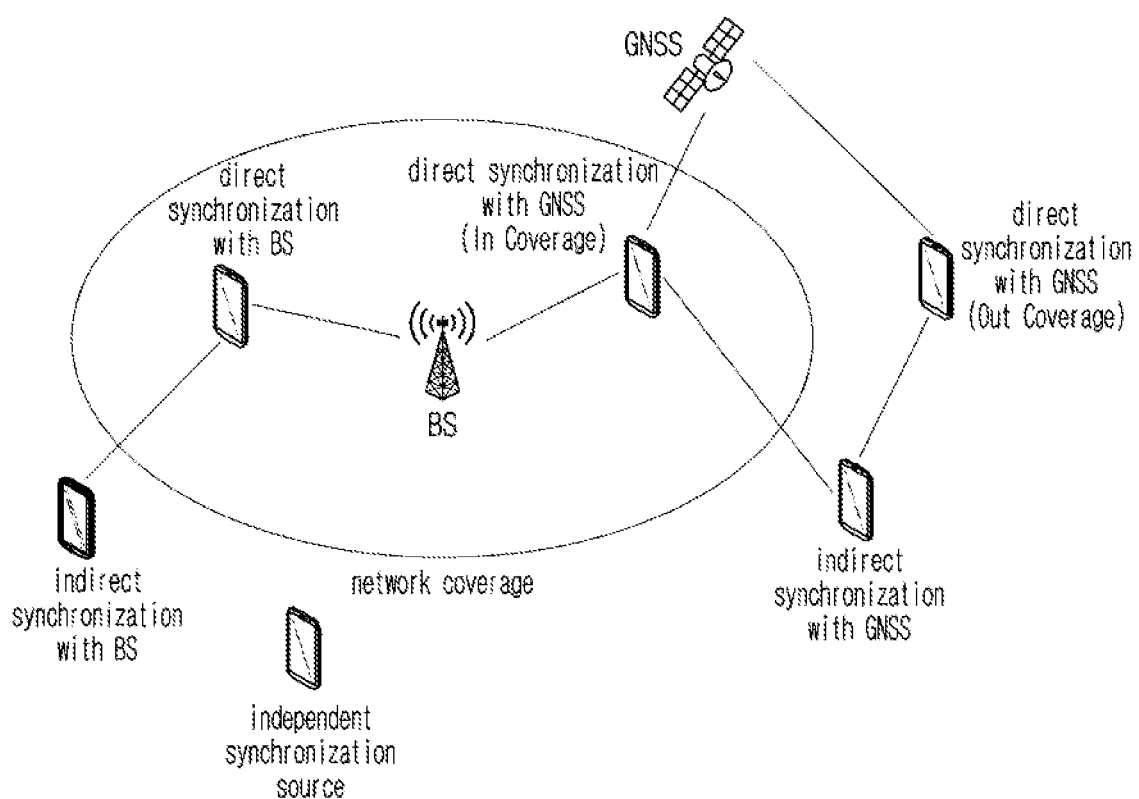
FIG. 4 illustrates a synchronization source or a synchronization reference of V2X according to an embodiment of the present disclosure.

FIG. 4 illustrates a synchronization source or synchronization reference of V2X applicable to the present disclosure. The embodiment of FIG. 4 may be combined with various embodiments of the present disclosure.

Referring to FIG. 4, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communication. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 1] or [Table 2]. [Table 1] or [Table 2] is merely an example, and the relationship between synchronization sources and synchronization priorities may be defined in various manners.

TABLE 1

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with NB/gNB |
| P2 | All UEs synchronized indirectly with GNSS | All UEs synchronized indirectly with eNB/gNB |
| P3 | All other UEs | GNSS |
| P4 | N/A | All UEs synchronized directly with GNSS |
| P5 | N/A | All UEs synchronized indirectly with GNSS |
| P6 | N/A | All other UEs |

TABLE 2

| Priority Level | GNSS-based synchronization | eNB/gNB-based synchronization |
|---|---|---|
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 1] or [Table 2], P0 may represent a highest priority, and P6 may represent a lowest priority. In [Table 1] or [Table 32], the BS may include at least one of a gNB or an eNB.

Whether to use GNSS-based synchronization or eNB/gNB-based synchronization may be (pre)determined. In a single-carrier operation, the UE may derive its transmission timing from an available synchronization reference with the highest priority.

For example, the terminal may (re)select a synchronization reference, and the terminal may obtain synchronization from the synchronization reference. In addition, the terminal may perform SL communication (e.g., PSCCH/PSSCH transmission/reception, Physical Sidelink Feedback Channel (PSFCH) transmission/reception, S-SSB transmission/reception, reference signal transmission/reception, etc.) based on the obtained synchronization.

Figure 5A:
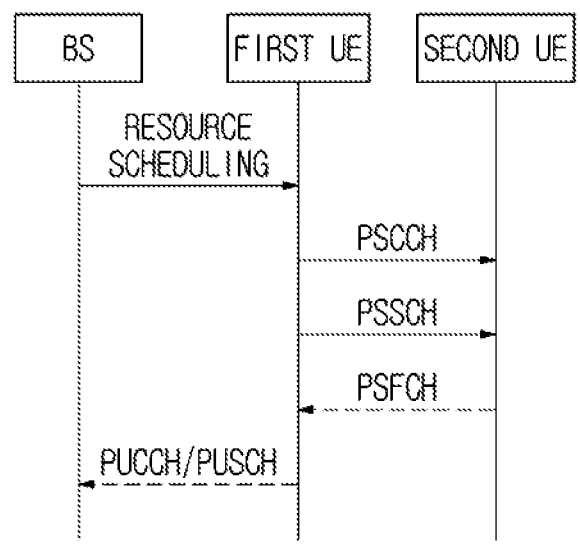
FIG. 5A and FIG. 5B illustrate a procedure in which a terminal performs V2X or SL communication according to a transmission mode, in accordance with an embodiment of the present disclosure.
Figure 5B:
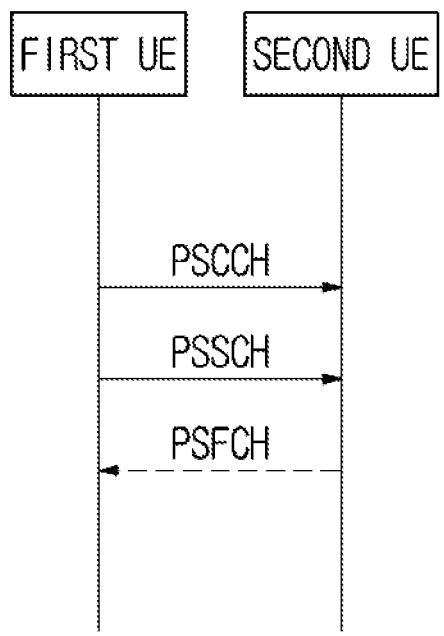

FIGS. 5A and 5B illustrate a procedure of performing V2X or SL communication by a terminal based on a transmission mode applicable to the present disclosure. The embodiment of FIGS. 9A and 9B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 5A exemplifies a UE operation related to an LTE transmission mode 1 or an LTE transmission mode 3. Alternatively, for example, FIG. 9B exemplifies a UE operation related to an NR resource allocation mode 1. For example, the LTE transmission mode 1 may be applied to general SL communication, and the LTE transmission mode 3 may be applied to V2X communication.

For example, FIG. 9B exemplifies a UE operation related to an LTE transmission mode 2 or an LTE transmission mode 4. Alternatively, for example, FIG. 9A exemplifies a UE operation related to an NR resource allocation mode 2.

Referring to FIG. 5A, in the LTE transmission mode 1, the LTE transmission mode 3, or the NR resource allocation mode 1, a BS may schedule an SL resource to be used by the UE for SL transmission. For example, the base station may transmit information related to SL resources and/or information related to UL resources to the first terminal. For example, the UL resources may include a PUCCH resource and/or a PUSCH resource. For example, the UL resources may be resources for reporting SL HARQ feedback to the base station.

For example, the first terminal may receive information related to a dynamic grant (DG) resource and/or information related to a configured grant (CG) resource from the base station. For example, the CG resource may include a CG type 1 resource or a CG type 2 resource. In this specification, the DG resource may be a resource configured/allocated by the base station to the first terminal through downlink control information (DCI). In this specification, the CG resource may be a (periodic) resource configured/allocated by the base station to the first terminal through DCI and/or RRC messages. For example, in the case of a CG type 1 resource, the base station may transmit an RRC message including information related to the CG resource to the first terminal. For example, in the case of a CG type 2 resource, the base station may transmit an RRC message including information related to the CG resource to the first terminal, and the base station may transmit DCI related to activation or release of the CG resource to the first terminal.

Subsequently, the first terminal may transmit a PSCCH (e.g., SCI (Sidelink Control Information) or 1st-stage SCI) to a second terminal based on the resource scheduling. Thereafter, the first terminal may transmit a PSSCH (e.g., 2nd-stage SCI, MAC PDU, data, etc.) related to the PSCCH to the second terminal. Thereafter, the first terminal may receive a PSFCH related to the PSCCH/PSSCH from the second terminal. For example, HARQ feedback information (e.g., NACK information or ACK information) may be received from the second terminal through the PSFCH. Thereafter, the first terminal may transmit/report HARQ feedback information to the base station through a PUCCH or PUSCH. For example, the HARQ feedback information reported to the base station may be information generated by the first terminal based on HARQ feedback information received from the second terminal. For example, the HARQ feedback information reported to the base station may be information generated by the first terminal based on a preset rule. For example, the DCI may be DCI for SL scheduling. For example, the format of the DCI may be DCI format 3_0 or DCI format 3_1. Referring to FIG. 9B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure.

For example, the sensing may be performed in unit of subchannels. For example, the first terminal that has selected a resource within the resource pool by itself may transmit a PSCCH (e.g., sidelink control information (SCI) or 1st-stage SCI) to the second terminal using the resource. Subsequently, the first terminal may transmit a PSSCH (e.g., 2nd-stage SCI, MAC PDU, data, etc.) related to the PSCCH to the second terminal. Thereafter, the first terminal may receive a PSFCH related to the PSCCH/PSSCH from the second terminal.

Referring to FIG. 5A or 5B, for example, the first terminal may transmit the SCI to the second terminal on the PSCCH. Alternatively, for example, the first terminal may transmit two consecutive SCIs (e.g., 2-stage SCI) to the second terminal on the PSCCH and/or the PSSCH. In this case, the second terminal may decode two consecutive SCIs (e.g., 2-stage SCI) to receive the PSSCH from the first terminal. In this specification, the SCI transmitted on the PSCCH may be referred to as 1st SCI, first SCI or 1st-stage SCI or 1st-stage SCI format, and SCI transmitted on the PSSCH is 2nd SCI, second SCI, 2nd-stage SCI or 2nd-stage SCI format. For example, the 1st-stage SCI format may include SCI format 1-A, and the 2nd-stage SCI format may include SCI format 2-A and/or SCI format 2-B. Referring to FIG. 9A or 9B, the first terminal may receive a PSFCH. For example, the first terminal and the second terminal may determine a PSFCH resource and the second terminal may transmit HARQ feedback to the first terminal using the PSFCH resource. In addition, referring to FIG. 9A, the first terminal may transmit SL HARQ feedback to the base station through a PUCCH and/or a PUSCH.

Figure 6A:
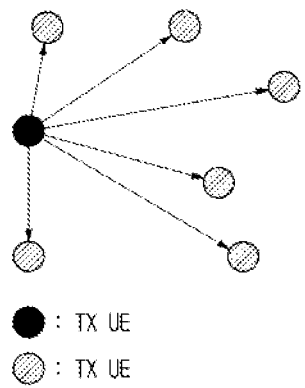
FIG. 6A to FIG. 6C illustrate 3 cast types according to an embodiment of the present disclosure.
Figure 6B:
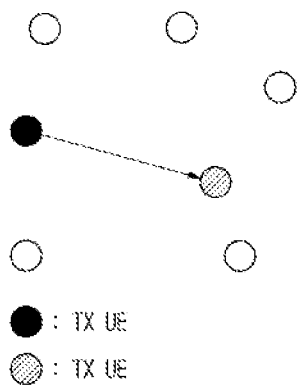
Figure 6C:
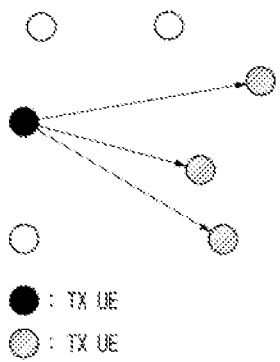

FIGS. 6A to 6C illustrate three cast types applicable to the present disclosure. The embodiment of FIGS. 6A to 6C may be combined with various embodiments of the present disclosure.

Specifically, FIG. 6A exemplifies broadcast-type SL communication, FIG. 6B exemplifies unicast type-SL communication, and FIG. 6C exemplifies groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hybrid Automatic Request (HARQ) Procedure

SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

In this specification, HARQ-ACK may be referred to as ACK, ACK information or positive-ACK information, and HARQ-NACK may be referred to as NACK, NACK information or negative-ACK information.

SL Measurement and Reporting

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

Sidelink Congestion Control

For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Figure 7:
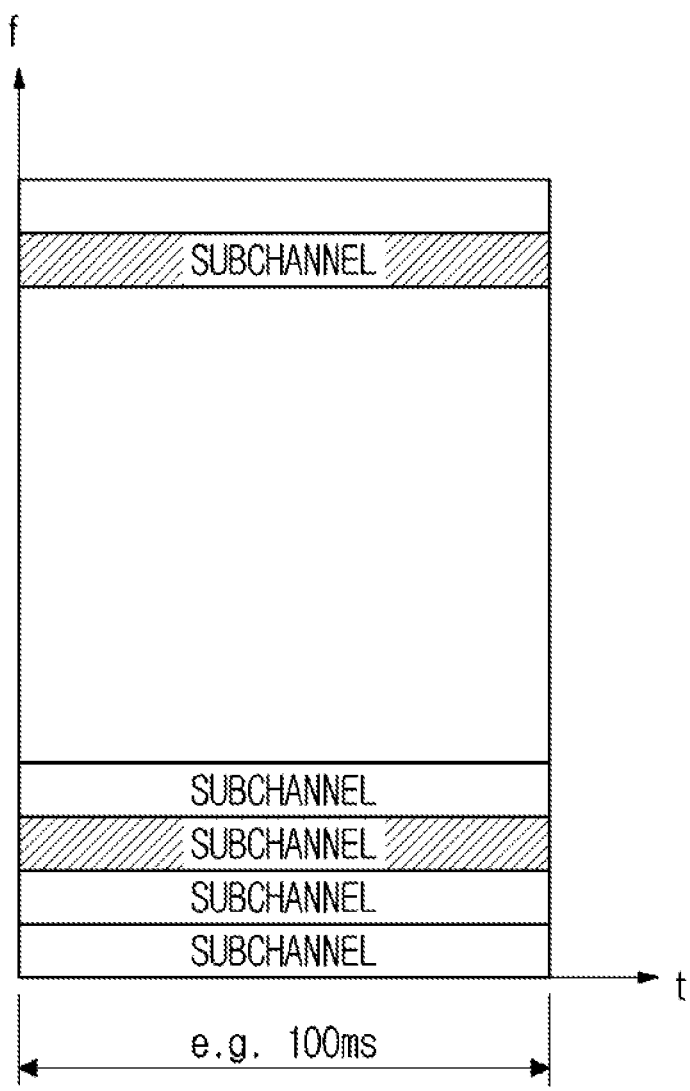
FIG. 7 illustrates a resource unit for CBR measurement according to an embodiment of the present disclosure.

FIG. 7 illustrates resource units for CBR measurement applicable to the present disclosure. The embodiment of FIG. 7 may be combined with various embodiments of the present disclosure.

Referring to FIG. 7, a CBR may refer to the number of subchannels of which the RSSI measurements are equal to or larger than a predetermined threshold as a result of measuring an RSSI in each subchannel during a specific period (e.g., 100 ms) by a UE. Alternatively, a CBR may refer to a ratio of subchannels having values equal to or greater than a predetermined threshold among subchannels during a specific period. For example, in the embodiment of FIG. 7, on the assumption that the hatched subchannels have values greater than or equal to a predetermined threshold, the CBR may refer to a ratio of hatched subchannels for a time period of 100 ms. In addition, the UE may report the CBR to the BS.

For example, when a PSCCH and a PSSCH are multiplexed in a frequency domain, the UE may perform one CBR measurement in one resource pool. When PSFCH resources are configured or preconfigured, the PSFCH resources may be excluded from the CBR measurement.

Further, there may be a need for performing congestion control in consideration of the priority of traffic (e.g., a packet). To this end, for example, the UE may measure a channel occupancy ratio (CR). Specifically, the UE may measure a CBR and determine a maximum value CRlimitk of a CR k (CRk) available for traffic corresponding to each priority (e.g., k) according to the CBR. For example, the UE may derive the maximum value CRlimitk of the channel occupancy ratio for the priority of traffic, based on a predetermined table of CBR measurements. For example, for relatively high-priority traffic, the UE may derive a relatively large maximum value of a channel occupancy ratio. Thereafter, the UE may perform congestion control by limiting the sum of the channel occupancy ratios of traffic with priorities k lower than i to a predetermined value or less. According to this method, a stricter channel occupancy ratio limit may be imposed on relatively low-priority traffic.

Besides, the UE may perform SL congestion control by using a scheme such as transmission power adjustment, packet dropping, determination as to whether to retransmit, and adjustment of a transmission RB size (MCS adjustment).

An example of SL CBR and SL RSSI is as follows. In the description below, a slot index may be based on a physical slot index.

SL CBR measured in a slot n is defined as portion of subchannels in which SL RSSI measured by a UE within a resource pool, sensed over CBR measurement window [n−a, n−1], exceeds a (pre)set threshold. Here, according to a higher layer parameter timeWindowSize-CBR, a is equal to 100 or 100·2µ slots. SL CBR may be applied to RRC_IDLE intra-frequency, RRC_IDLE inter-frequency, RRC_CONNECTED intra-frequency and RRC_CONNECTED inter-frequency.

SL RSSI is defined as a linear average of a total receive power ([W] unit) observed in a configured subchannel in OFDM symbols of a slot configured for a PSCCH and a PSSCH starting from a second OFDM symbol. For FR1, a reference point for SL RSSI shall be an antenna connector of a UE. For FR2, SL RSSI shall be measured based on a combined signal from antenna elements corresponding to a given receiver branch. For FR1 and FR2, if receive diversity is used by a UE, a reported SL RSSI value shall not be less than corresponding SL RSSI of any of individual receiver branches. SL RSSI may be applied to RRC_IDLE intra-frequency, RRC_IDLE inter-frequency, RRC_CONNECTED intra-frequency and RRC_CONNECTED inter-frequency.

An example of an SL CR (Channel occupancy Ratio) is as follows. The SL CR evaluated in a slot n is defined as dividing a total number of subchannels used for transmission in slot [n−a, n−1] and granted in slot [n, n+b] by a total number of subchannels configured in a transmission pool over slot [n−a, n+b]. SL CR may be applied to RRC_IDLE intra-frequency, RRC_IDLE inter-frequency, RRC_CONNECTED intra-frequency and RRC_CONNECTED inter-frequency. Here, a may be a positive integer and b may be 0 or a may be a positive integer. a and b is determined by UE implementation, and a+b+1=1000 or a+b+1=1000·2µ according to higher layer parameter timeWindowSize-CBR. b<(a+b+1)/2 and n+b shall not exceed a last transmission opportunity of a grant for current transmission. SL CR is evaluated for each (re)transmission. In evaluating SL CR, according to grant(s) present in slot [n+1, n+b] without packet dropping, a UE shall assume that a transmission parameter used in slot n is reused. A slot index may be a physical slot index. SL CR may be calculated per priority level. If it is a member of a sidelink grant defined in TS 38.321, the resource is treated as granted.

Embodiments of the Present Disclosure

In sidelink communication, terminals may perform communication by considering a relative distance (or location). As an example, in case of sidelink group cast, whether or not to transmit HARQ-ACK may be determined based on a distance between terminals (or locations). Herein, a distance (or location) of a terminal may be inferred through a zone ID based on a zone. Herein, the zone ID may be calculated based on Table 3 below but is not limited to the embodiment below.

In addition, FIG. 8 is a view showing a zone ID according to an embodiment of the present disclosure. As an example, referring to FIG. 8 and Table 3 below, after a region is divided into predetermined areas of units starting from an origin, a corresponding region is divided again into 4096 zones, and then zone IDs may be allocated. As an example, according to a WGS84 model, a zone ID may be allocated in a predetermined square size (e.g., 5×5 to 50×50) using geographical coordinates starting from (0, 0). Herein, zone IDs of 0 to 4095 may be allocated in each block, which may be repeated as shown in FIG. 8. That is, a same zone ID may be periodically repeated. As an example, when zones are distinguished based on every geographical coordinate in a sidelink (or V2X) communication service, since no zone ID needs to be uniquely used, a zone ID may be allocated and repeated in each block as shown in Table 3 below and FIG. 8. However, the above-described method is merely one example and may not be limited to the above-described embodiment.

TABLE 3

<Zone identity calculation>

The UE shall determine an identity of the zone (i.e. Zone_id) in which it is located using the following formulae, if sl-ZoneConfig is configured:
x1= Floor (x / L) Mod 64;
y1= Floor (y / W) Mod 64;
Zone_id= y1 * 64 + x1
The parameters in the formulae are defined as follows:
L and W are the same value of sl-ZoneLength included in sl-ZoneConfig;
sl-ZoneLength-r16 ENUMERATED { m5, m10, m20, m30, m40, m50, spare2
x is the geodesic distance in longitude between UE's current location and geographical coordinates (0, 0) according to WGS84 model and it is expressed in meters;
y is the geodesic distance in latitude between UE's current location and geographical coordinates (0, 0) according to WGS84 model and it is expressed in meters.

However, as an example, when a relative distance between terminals is calculated, as a distance between terminals is based on an overlapping zone ID in adjacent regions, a wrong zone ID is selected so that the relative distance can be miscalculated.

Figure 9:
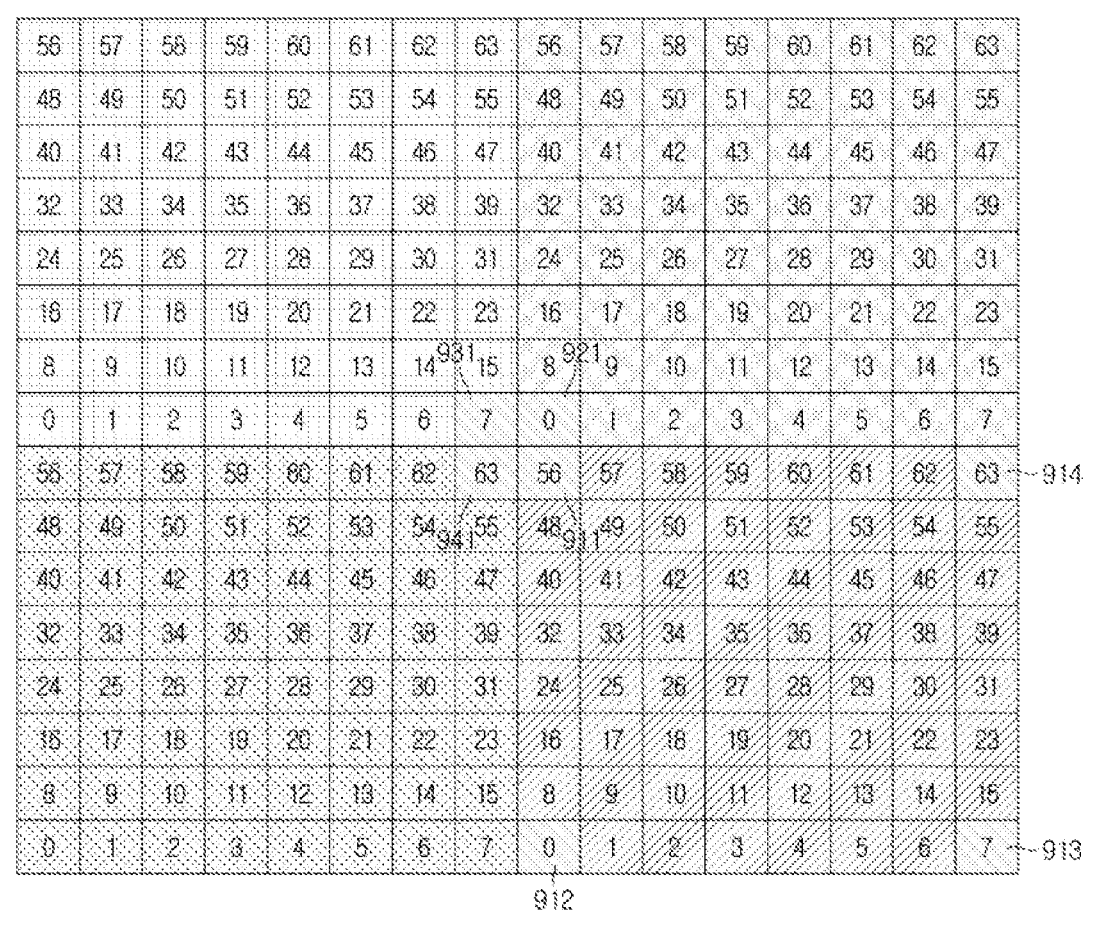

More specifically, FIG. 9 is a view showing a zone ID according to an embodiment of the present disclosure. As an example, referring to FIG. 9, based on an overlapping zone ID in an adjacent region, an error may occur to a relative distance between terminals. As an example, FIG. 9 may be a case in which zone IDs of 0 to 63 are allocated to each block. As an example, in the above-described example, zone IDs of 0 to 4095 are allocated to each block, but for convenience of explanation, the description below will be based on a case in which zone IDs of 0 to 63 are allocated to each block. However, this is merely one example, the number of zone IDs in one block may be different, and for convenience of explanation, the description below will be based on zone IDs of 0 to 63.

Herein, referring to FIG. 9, for terminals contained in zone IDs at a boundary of blocks, a problem may occur in identifying an accurate zone ID. As an example, a case may be considered in which a first terminal is located in a zone corresponding to a zone ID "56" 911. At this time, a case may be considered in which a zone ID of a second terminal is "0" 912 or 921, "7" 913 or 931, or "63" 914 or 941. Herein, the first terminal may not be capable of determining, based on the zone ID of the second terminal, whether or not the second terminal is a zone ID 912, 913 and 914 located in a same block or a zone ID 921, 931 and 941 present in a different block. As an example, as described above, in the case of sidelink group cast, whether or not to transmit HARQ-ACK may be determined based on a distance between terminals, and an operation may have an error when an error occurs to the above-described zone ID.

Figure 10:
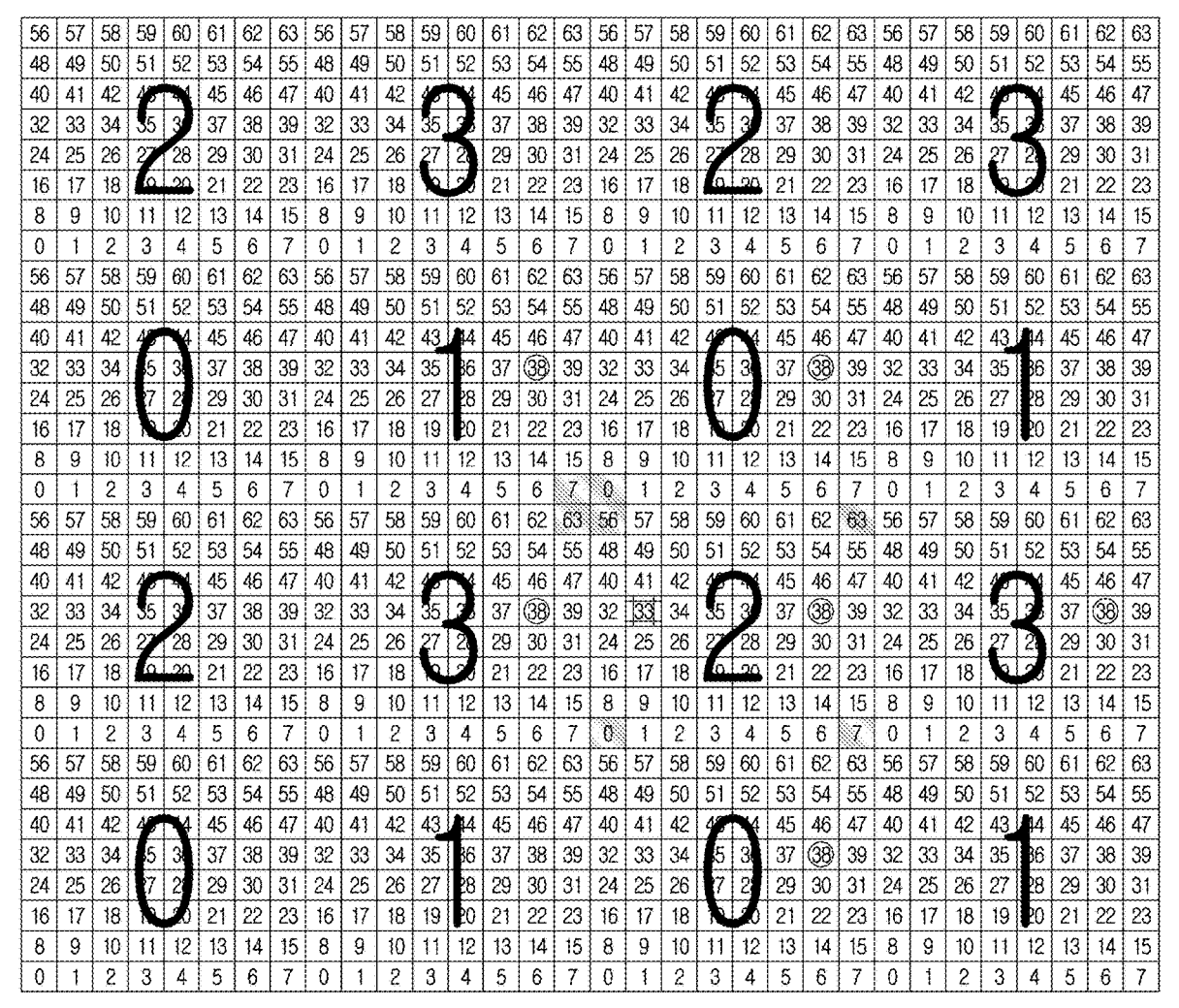
Figure 11:
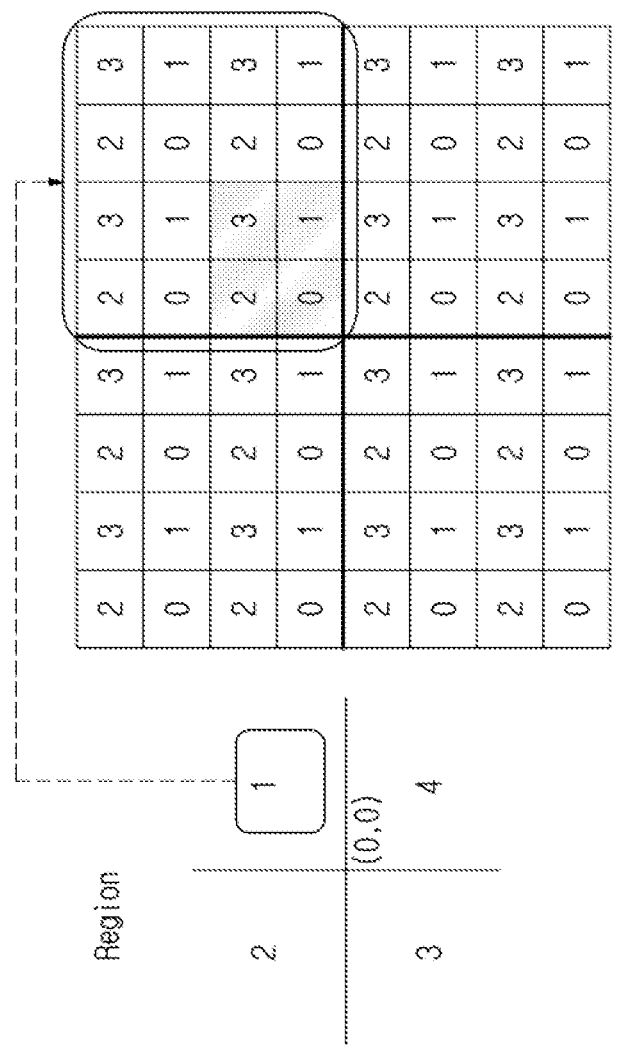
FIG. 11 is a view showing a block ID according to an embodiment of the present disclosure.

As an example, FIG. 10 and FIG. 11 are a view showing a method for distinguishing zone IDs based on a block ID according to an embodiment of the present disclosure. Referring to FIG. and FIG. 11, a block ID may be set to each block in which a zone ID is set. As an example, in FIG. 10, 64 zone IDs may be allocated to each block (the same applies to a case where the number of zone IDs is 64). Herein, a block ID may be additionally allocated to each block. As an example, as for a block size, 2-bit 4 block IDs may be used to distinguish adjacent blocks based on a sidelink (or V2X service) region.

Herein, the problem of an overlapping zone ID may occur only to adjacent blocks, and for blocks that are relatively distant from each other, even when there is an overlapping zone ID, the signal intensity is low due to the long relative distance, and no problem of zone ID confusion may occur.

In consideration of what is described above, a block ID may be used to distinguish adjacent blocks, and 4 block IDs may be used. As another example, 3-bit 8 block IDs may be used and are not limited to a specific embodiment. As an example, based on a service region of sidelink (or V2X) and a block size, a different number of block IDs may be set, which is not limited to the above-described embodiment.

Herein, when a block ID is 2 bits, the block ID may be marked by 0 to 3. In addition, when a block ID is 3 bits, the block ID may be marked by 0 to 7. Herein, the block ID may be determined based on Equation 1 blow. Herein, w, y, L and W may be the same as those of zone ID calculation in Table 3, and n may be a bit depth of a block ID.

That is, based on Equation 1 below, different block IDs may be allocated to adjacent blocks as shown in FIG. 10 and FIG. 11.

$$x = (\text{Floor}(x/(L*64)))\text{Mod } n, y = (\text{Floor}(y/(W*64)))\text{Mod } n \quad \text{[Equation 1]}$$

$$\text{Block\_id} = y*n + x$$

In addition, as an example, a block size may be configured by a RRC parameter based on an upper layer setting. Herein, each block may be a square with the same horizontal and vertical length, and the horizontal or vertical length may be one of 320 m, 640 m, 1.2 km, 1.92 km, 2.56 km and 3.2 km. The number of block IDs may be determined by considering the above-described block size. As an example, when the block size is small, since a distance between adjacent blocks may be relatively short, the number of block IDs may be set to be large. On the other hand, when the block size is large, the distance between adjacent blocks may be relatively long so that the number of block IDs may be set to be small.

As another example, a block ID may be transmitted together with a zone ID. In addition, as an example, block ID transmission may be disabled based on a block size or a RRC configuration. As an example, when a block size is sufficiently large, a zone ID may not be confused between terminals even when no block ID is considered, and in the above-described case, block ID transmission may be disabled.

As another example, according to each block size, the number of block IDs and whether or not to transmit a block ID may be set in advance. As an example, when a block size is smaller than a first threshold, a block ID may be set in 3 bits, and when the block size is greater than the first threshold but smaller than a second threshold, the block ID may be set in 2 bits. On the other hand, when the block ID is greater than the second threshold, block ID transmission may be disabled but is not limited to the above-described embodiment.

As described above, when whether or not to transmit HARQ ACK in sidelink groupcast is determined based on a zone ID and a block ID, a relative distance of a terminal may be clearly identified. As another example, like in mmWave V2X, when sidelink communication is performed based on beamforming, a beam direction between terminals may be identified based on a zone ID and a block ID, and beam alignment may be quickly performed accordingly.

Figure 12:
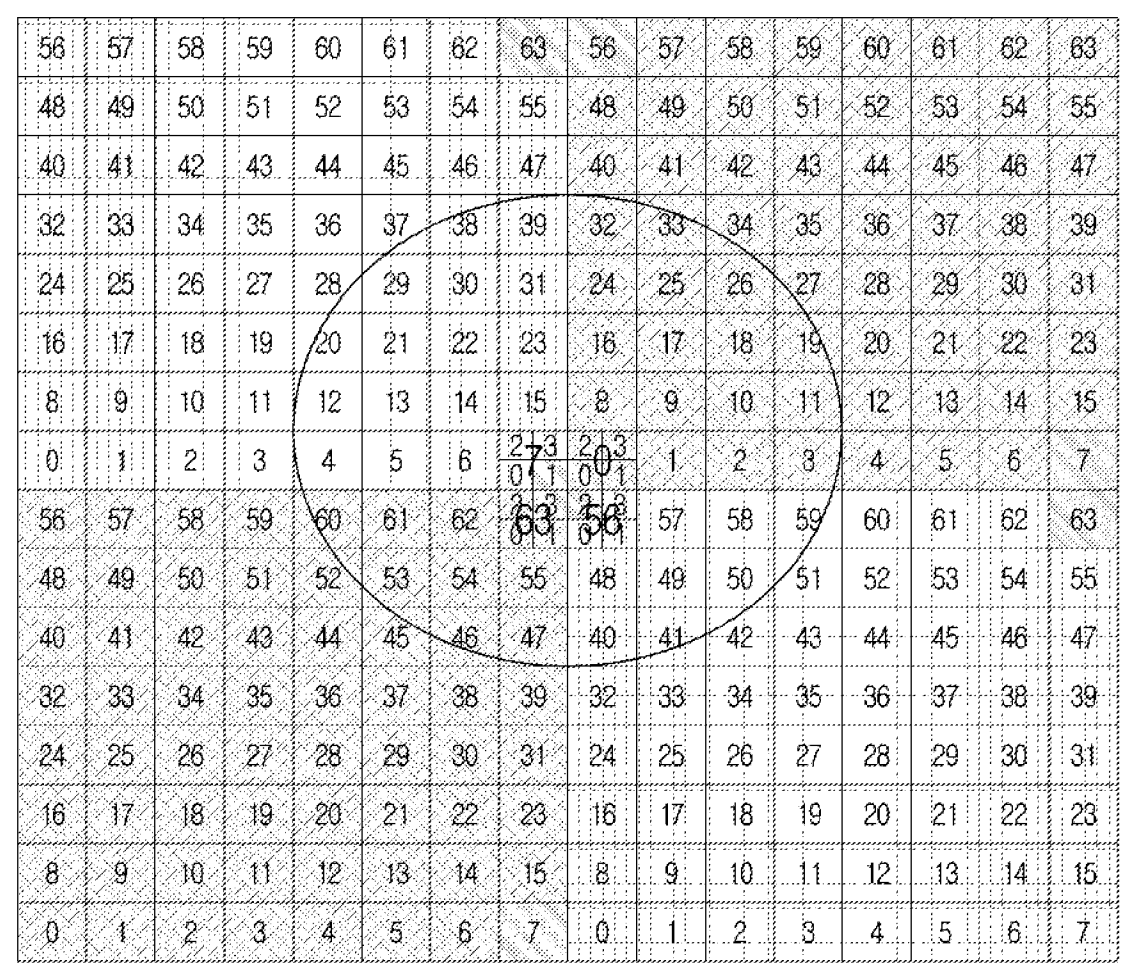

Next, FIG. 12 is a view showing a method of configuring a plurality of zone IDs according to an embodiment of the present disclosure. Referring to FIG. 12, a unique zone ID needs to exist within a sidelink communication service region. To this end, a minimum size of a block greater than a service target distance (or maximum distance) may be configured as a zone length size so that only one zone ID can be present within a service region. In addition, as an example, a sub-zone ID may be set to enhance the resolution of a zone ID. That is, in order to support an operation according to a detailed location when the accuracy of a relative distance between terminals is enhanced, a single zone may be divided into n equal parts, each of which may be set as a sub-zone and have an ID allocated to it. Herein, as an example, a sub-zone ID may be always transmitted with a zone ID. As another example, a unique zone ID may be transmitted in a broadcast or initial accessing process, and 2 zone IDs may be transmitted after connection is completed, but the present disclosure is not limited to the above-described embodiment.

Next, a method of transmitting zone ID information between terminals may be considered. A zone ID may be used in sidelink communication. As an example, when whether or not to transmit HARQ-ACK of sidelink group cast is determined based on a relative distance between terminals, a zone ID may be utilized. As another example, in mmWave V2X communication, when sidelink communication is performed based on beamforming, zone ID information may be utilized for beam acquisition, beam tracking, beam recovery and beam sweeping operations based on beam alignment. In addition, zone ID information may also be utilized in relation to power control, transmission/reception timing control, and service start and end, but the present disclosure is not limited to the above-described embodiment.

Herein, a zone ID may be information that is set based on Table 3 described above. As an example, when the number of zone IDs ranges 0 to 4095, a zone ID may be configured by 12 bits. Herein, in sidelink communication, terminals may change their locations by constantly moving. When terminals constantly exchange 12-bit zone ID information based on a change of location, the waste of a resource for zone ID information exchange may increase. In consideration of what is described above, a method of delivering absolute location information for a zone ID and relative change information may be needed, which will be described below.

As an example, in sidelink communication, a terminal may deliver relative location information based on absolute location information (e.g., zone ID information). More specifically, when initial connection or reconnection is performed between terminals that perform sidelink communication, a terminal delivering location information (hereinafter, "terminal A") may deliver absolute location information of the terminal A to a terminal B. That is, the terminal A may transmit the zone ID information of the terminal A to the terminal B. Next, based on the zone ID of the terminal A, the terminal B may set a region with a predetermined size centering around an absolute location of the terminal A. Herein, the terminal B may assign a new index to a zone within the region with the predetermined size centering around the absolute location of the terminal A. As an example, indexes may be assigned from 0 to "zone ID–1". Next, the terminal B may transmit an index to the terminal A based on a location of the terminal B. In addition, as an example, when the location of the terminal A changes, the terminal A may calculate relative location information as an amount of location change from a time of delivering the absolute location information of the terminal A. As an example, when the terminal A delivers absolute location information to the terminal B, the terminal A may store the absolute location information at the time and identify an index for a changed location of the terminal A as relative location information based on the absolute location information, thereby calculating the relative location information and transmitting index information to the terminal B.

In addition, as an example, it is possible to consider that the terminal A and the terminal B perform mutual connection and the location of each of them is changed while still being connected. The terminal A may identify relative location information of the terminal A through an index that is newly assigned to a zone within a region with a predetermined size around the location of the terminal A as the above-described absolute location. That is, when the location of the terminal A is changed, the terminal A may deliver information on an amount of the location change of the terminal A to the terminal B by transmitting, to the terminal B, an index for the region where the terminal A is located. In addition, when the location of the terminal B is changed, the terminal B may assign an index for each zone within a predetermined region around a previous location of the terminal B and indicate an amount of relative location change of the terminal B to the terminal A by transmitting, to the terminal A, an index for a region where the terminal B is located.

Herein, as an example, a range of indexes may be set, each of which is assigned in a region with a predetermined size around an absolute location. That is, an index may be assigned up to a predetermined region from the absolute location. As an example, when each terminal moves out of the predetermined region described above, a terminal may transmit absolute location information to its counterpart. As another example, when each terminal stays within the predetermined range described above, a terminal may transmit absolute location information to its counterpart based on a predetermined cycle or triggering condition (e.g., a channel environment, a vehicle speed, a travel distance). Herein, as an example, the absolute location information may be location information that is obtained by setting a zone based on a location of a terminal, as described above, and by calculating a zone ID.

In addition, as an example, location information, which is changed in each terminal, may be transmitted to another terminal at a time when the location information is changed. That is, when each terminal recognizes that its location is changed, it may identify and transmit relative location information to another terminal. As another example, when each terminal transmits information on a changed location every time when its location is changed, power consumption and resource waste may occur. In consideration of what is described, each terminal may deliver relative location information to another terminal based on at least one of a preset time (or cycle) and a preset condition but is not limited to a specific embodiment.

As another example, as described above, an overall size of a region set for relative location information may be uniformly set, irrespective of a zone size. As an example, it is possible to set a different zone size, but an overall size of a region set for delivering relative location information may be irrelevant to the zone size since the overall size is a value that is set based on an amount of relative location change. Herein, in case the zone size is large, the number of zones within the region set for delivering relative location information may be reduced and represented by a small bit number. On the other hand, in case the zone is relatively small, the number of zones within the region set for delivering relative location information may increase and be represented by a large bit number, but the present disclosure is not limited to the above-described embodiment.

In addition, as an example, a size of a region, which is set for delivering relative location information, may be determined based on at least any one of a channel environment, a travel speed, and a service, but is not limited to a specific embodiment.

In addition, as an example, the above-described zone may also be applied not only to a zone set by 3GPP in Table 3 but also to a zone, which is separately set, or a plurality of zones and may not be limited to a specific shape. In addition, as an example, terminals may have a same zone configuration and have relevant information configured from a network in order to set a region for delivering relative location information.

In addition, in order to enable terminals to have a same zone configuration and to set a region for delivering relative location information. a corresponding value may be preconfigured in a terminal, but the present disclosure is not limited to the above-described embodiment.

As another example, two terminals performing sidelink communication may deliver relative location change information based on a previous location. As an example, each terminal may assign an index to each zone in a region with a predetermined size based on absolute location information and deliver relative location information to another terminal based on index information. Herein, when a location of a terminal is changed again, the terminal may set a predetermined region based on a previous location, assign an index to each zone within the region and then deliver relative location information to another terminal again based on index information. That is, a predetermined region is set again based on information on a previous location, and relative location information may be indicated through an index that is assigned based on this.

Herein, as an example, when relative information delivery is missed, since relative location information is delivered based on a previous location of a terminal, an error may be continuously accumulated. In consideration of what is described above, a terminal deliver absolute location information as well as relative location information to another terminal. That is, a terminal may selectively transmit specific location information between relative location information and absolute location information. Accordingly, when receiving location information, a terminal needs to check whether the received location information is relative location information or absolute location information.

Herein, as an example, location information may be delivered based on a same format. That is, absolute location information and relative location information may be in a same format, and an additional 1 bit may further be allocated to location information in order to distinguish between the absolute location information and the relative location information. As an example, when an added bit is a first value, it may indicate absolute location information, and when an added bit is a second value, it may indicate relative location information, but the present disclosure may not be limited the above-described embodiment.

As another example, a format for relative location information and a format for absolute location information may be different. Herein, as an example, location information for each terminal may be delivered to another terminal based on at least one of sidelink control information (SCI) and medium access control (MAC) control element (CE). Herein, when absolute location information and relative location information are transmitted in different formats, an SCI format including the absolute location information may be different from an SCI format including the relative location information. That is, a terminal receiving SCI may identify absolute location information and relative location information based on an SCI format. In addition, as an example, when absolute location information and relative location information are transmitted in different formats, the relative location information may be transmitted to another terminal through SCI, and the absolute location information may be transmitted to another terminal through MAC CE, but the present disclosure is not limited to the above-described embodiment.

In addition, as an example, when absolute location information and relative location information are transmitted in a same format, location information may be allocated based on bits (12 bits+additional bits) that correspond to the absolute location information. Herein, in case the relative location information is delivered, location information may be represented only in some bits. Accordingly, some reserved bits may be utilized for another purpose. As a concrete example, when a zone has a large size, the number of zones in a predetermined size of region may be small so that a bit number of relative location information may also be small. In this case, the remaining bits may be used for a sub zone ID indicating a corresponding region among regions within a corresponding zone, and thus more accurate location information may be delivered, but the present disclosure may not be limited thereto.

As another example, when location information transmission is limited to terminal-to-terminal communication in a predetermined region according to a service, an additional bit for distinguishing absolute location information and relative location information may not be needed, but the present disclosure is not limited to the above-described embodiment.

Figure 13B:
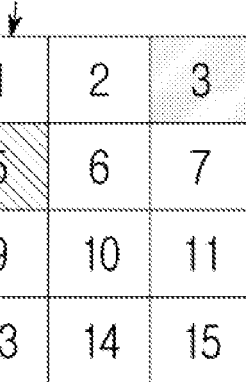
FIG. 13B is a view showing a method for exchanging location information between terminals according to an embodiment of the present disclosure.

As a concrete example, FIGS. 13A to 13D are views showing location information according to an embodiment of the present disclosure. Referring to FIG. 13A, it is possible to consider a case in which a terminal A 1310 and a terminal B 1320 perform sidelink communication. Herein, absolute location information (zone ID) in an initial location of the terminal A 1310 may be 324, and absolute location information (zone ID) in an initial location of the terminal B 1320 may be 454. Herein, the absolute location information may be 12-bit information, and each of the terminals 1301 and 1320 may exchange the absolute location information based on a predetermined cycle. As another example, each of the terminals 1310 and 1320 may exchange the absolute location information based on a triggering condition. As another example, each of the terminals 1310 and 1320 may exchange the absolute location information together with data, but the present disclosure is not limited to the above-described embodiment.

In addition, as an example, referring to FIG. 13B, based on the absolute location information (zone ID 324) of the terminal A 1310, which is received from the terminal A 1310, the terminal B 1320 may set a predetermined region and assign an index to each zone within the region. Herein, in order to transmit location information of the terminal B 1320 to the terminal A 1310, the terminal B 1320 may transmit 3 that is a value indexed based on a location of the terminal A 1310. Thus, the terminal A 1310 may identify a location of the terminal B 1320. Herein, a predetermined region for delivering relative location information may be determined by a service, a channel environment, and other environments. As an example, the number of zones within a same region may be different according to each zone size, which is the same as described above.

Herein, as an example, when the terminal B 1320 is located outside a predetermined region based on a location of the terminal A 1310, the terminal B 1320 may transmit absolute location information (zone ID) of the terminal B 1320 to the terminal A 1310. Herein, as an example, location information may further include 1-bit information, which indicates absolute location information or relative location information, and thus when the terminal B 1320 transmits absolute location information, the terminal A 1310 may recognize this.

Herein, as an example, although a further 1 bit (12+1 bit) may be needed to distinguish absolute location information and relative location information, relative location information may be exchange more frequently based on a predetermined region, and thus a bit number may be reduced. As an example, when the terminal B 1320 is located within a predetermined region, 5-bit location information may be generated according to FIG. 13B. On the other hand, when the terminal B 1320 is located outside a predetermined region, 13-bit location information may be generated, but the present disclosure is not limited thereto. In addition, as an example, according to a service, when there is a limitation to terminal-to-terminal communication within a predetermined region, 1 bit for distinguishing between inside and outside the predetermined region may not be used.

In addition, as an example, referring to FIG. 13C, each of the terminals 1310 and 1320 may indicate relative location information based on previous location information. As an example, when the location of the terminal A 1310 is changed, the terminal A 1310 may set a region with a predetermined size based on the location of the terminal A at a time of transmitting absolute location information to the terminal B and assign a new index to each zone within the region. Herein, as the terminal A 1310 identifies corresponding index information based on the changed location of the terminal A and transmits the index information to the terminal B 1320, the terminal B 1320 may identify the changed location information of the terminal A 1310.

In addition, as an example, when the location of the terminal B 1320 is changed, the terminal B 1320 may set a region with a predetermined size again based on the location of the terminal B at a time of transmitting relative location information to the terminal A and assign a new index to each zone within the region. Herein, as the terminal B 1320 identifies corresponding index information based on the changed location of the terminal B and transmits the index information to the terminal A 1310, the terminal A 1310 may identify the changed location information of the terminal B 1320. That is, each terminal may set a predetermined size of region based on a previous location, assign a new index to each zone within the region and deliver changed location information to another terminal based on an index.

Figure 13D:
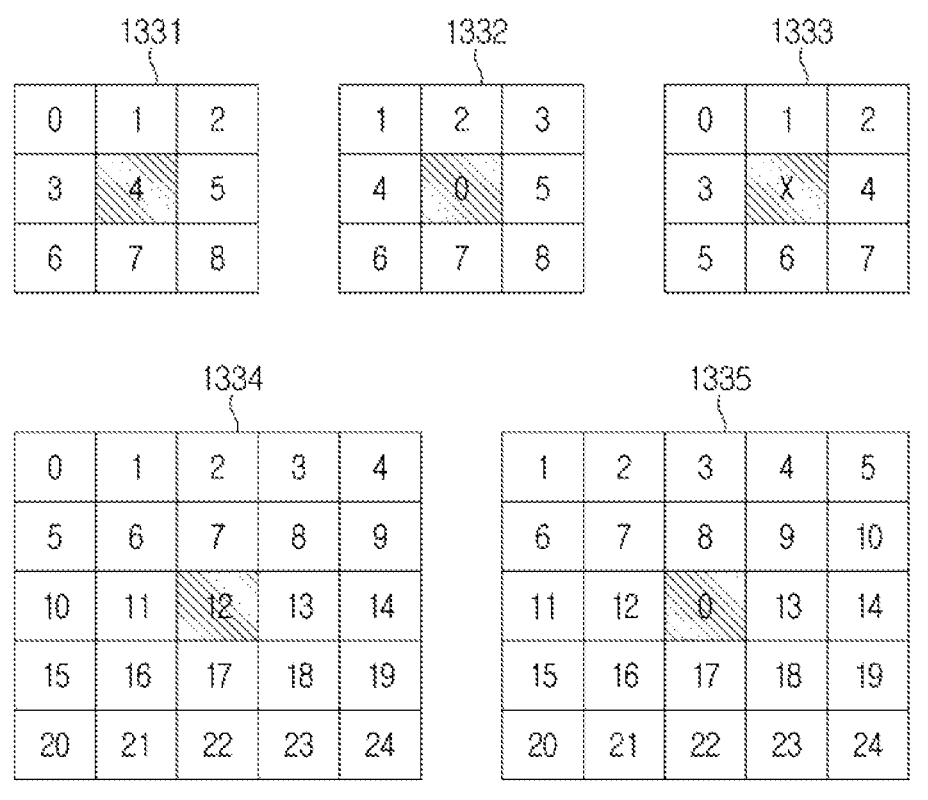

Herein, as an example, referring to FIG. 13D, it is a view showing a case in which an index is allocated to indicate relative location information. As an example, a first index pattern 1331 and a second index pattern 1332 may allocate an index for relative location information by including a previous location (center of each view) of a terminal around the previous location of the terminal. As an example, in the cases of the first index pattern 1331 and the second index pattern 1332, even when the location of a terminal is not changed, location information of the terminal may be indicated based on a periodic or aperiodic request. On the other hand, a third index pattern 1333 may be allocated around a previous location of a terminal without including the previous location of the terminal. That is, the third index pattern 1333 may be used only when a location of a terminal is changed, and the present disclosure is not limited to the above-described embodiment.

As another example, considering a case in which a zone has a small size, a location of a terminal may be frequently changed. In consideration of what is described above, a predetermined region may be set to be larger like in a fourth index pattern 1334 or a fifth index pattern 1335, and the present disclosure may not be limited to a specific embodiment.

Based on what is described above, a predetermined region and an index for delivering relative location information may be allocated based on a previous location of a terminal, and a region may be set again in a same manner based on a changed location. As an example, as described above, when relative location information is delivered based on a previous location, if an error occurs to the relative location information, the error may be continuously accumulated. As an example, in consideration of what is described above, absolute location information may be selectively transmitted, which is the same as described above.

In addition, as an example, when terminals performing terminal-to-terminal communication for absolute location information and relative location information perform initial transmission (or are reconnected), location information may be delivered based on absolute location information (zone ID), and then information on a change value alone may be delivered as relative location information. As an example, a size of a predetermined region may be determined by considering a service/environment (e.g., a terminal travel speed and an average amount of location change) of each terminal, and index information may be delivered to another terminal after indexing from 0 to N−1 is performed based on the number of zones within the region. As a concrete example, absolute location information may be transmitted only under a predetermined condition. As an example, a specific condition may precede initial access. In addition, the specific condition may be a case of attempting connection again based on radio link failure (RLF). In addition, the specific condition may be a case of configuring periodic transmission but is not limited to the above-described embodiment. Herein, as an example, except in the above-described case, relative location information may be transmitted.

In addition, as an example, in sidelink communication (or V2X) of a new communication system, beamforming may be applied based on mmWave V2X communication. Herein, when a broadband like mmWave is used, a symbol length of a transmission signal becomes short, and a cyclic prefix (CP) length may become short accordingly. Thus, synchronization between terminals may be important in sidelink (or V2X) communication, and hereinafter will be described a method of setting a timing offset according to locations of terminals that refer to cell timing of a base station in mmWave V2X communication. As an example, terminals performing sidelink communication may select a reference source for sidelink synchronization. Herein, a synchronization reference source may consider a mode of operation based on a global navigation satellite system (GNSS) and a mode of operation based on a base station. Herein, terminals performing sidelink communication may identify a mode for a reference source by checking system information of a cell and select a reference source with a high priority among reference sources corresponding to the mode.

As an example, Table 4 below may show a priority for each reference source in a reference source mode based on a base station. Herein, terminals performing sidelink communication may select a reference source based on the above-described priority and perform synchronization by adjusting a slot boundary based on sidelink transmission (or reception) to timing of a reference synchronization source.

TABLE 4

P0: gNB/eNB
P1: UE directly synchronized to gNB/eNB
P2: UE indirectly synchronized to gNB/eNB
P3: GNSS
P4: UE directly synchronized to GNSS
P5: UE indirectly synchronized to GNSS
P6: the remaining UEs have the lowest priority.

Herein, as described above, when a broadband like mmWave V2X is used, a CP length of a symbol may be short. At this time, in a mode using a base station (e.g., gNB/eNB/ng-eNB) as a synchronization reference source of terminals, based on relative locations of terminals, a reception signal may get out of a CP according to a transmission direction.

Figure 14:
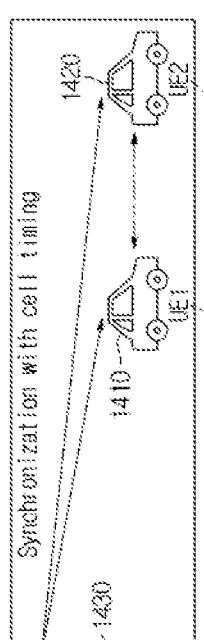
FIG. 14 is a view showing a method for synchronizing transmission times between terminals according to an embodiment of the present disclosure.

As an example, FIG. 14 is a view showing a method of setting a timing offset according to locations of terminals in accordance with an embodiment of the present disclosure. Referring to FIG. 14, a terminal 1 1410 and a terminal 2 1420 may be in the coverage of a base station 1430. Herein, when each of the terminals performs connection to the base station, the base station may provide its location information. However, the location information of the base station may be relative location information to the terminal, not absolute coordinate information, and may be provided to the terminal together with configuration information.

Herein, the configuration information may be zone configuration information, based on which a zone ID may be used. As an example, a zone ID may be calculated as in the above-described Table 3. Herein, each of the terminals 1410 and 1420 may calculate a zone ID and recognize a location relation with the base station 1430 based on the zone ID. Herein, each of the terminals 1410 and 1420 may perform sidelink communication and control a signal transmission time according to a transmission direction when transmitting a signal to another terminal.

Herein, it is possible to consider a case in which the above-described terminal 1 1410 and terminal 2 1420 do not perform transmission according to a synchronization signal between terminals but perform synchronization based on the base station 1430. As an example, the base station 1430 may deliver information on Table 5 below as a zone-related configuration to respective terminals (gNB/eNB).

TABLE 5 sl-ZoneLength-r16 ENUMERATED { m5, m10, m20, m30, m40, m50, spare2}

Herein, the base station may set a different resource pool according to each zone. In addition, whether or not to transmit HARQ-ACK of group cast may be determined according to a terminal location since it is associated with a zone, as described above. In addition, a size of a zone may be set differently based on a sidelink communication (or V2X communication) distance, which is the same as described above.

Herein, as an example, it is possible to consider a case in which terminals performing sidelink communication are synchronized with cell timing of a same base station (e.g., gNB). That is, terminals performing sidelink communication may not be synchronized according to a synchronization signal between terminals but perform synchronization based on a base station. Herein, when terminals performing sidelink communication are connected with a base station, the terminals performing sidelink communication may receive, from the base station, a zone ID of the base station based on a location of the base station in addition to a zone configuration. Accordingly, each of the terminals performing sidelink communication may know a relative location to a corresponding base station as a synchronization reference source. Herein, when a terminal performing sidelink communication transmits a signal to another terminal, the terminal may change transmission timing (time advance) based on location information relative to a base station. As another example, a reception terminal, which receives data based on sidelink communication, may control a signal sent by a transmission terminal to be within a CP by controlling reception timing.

Figure 15:
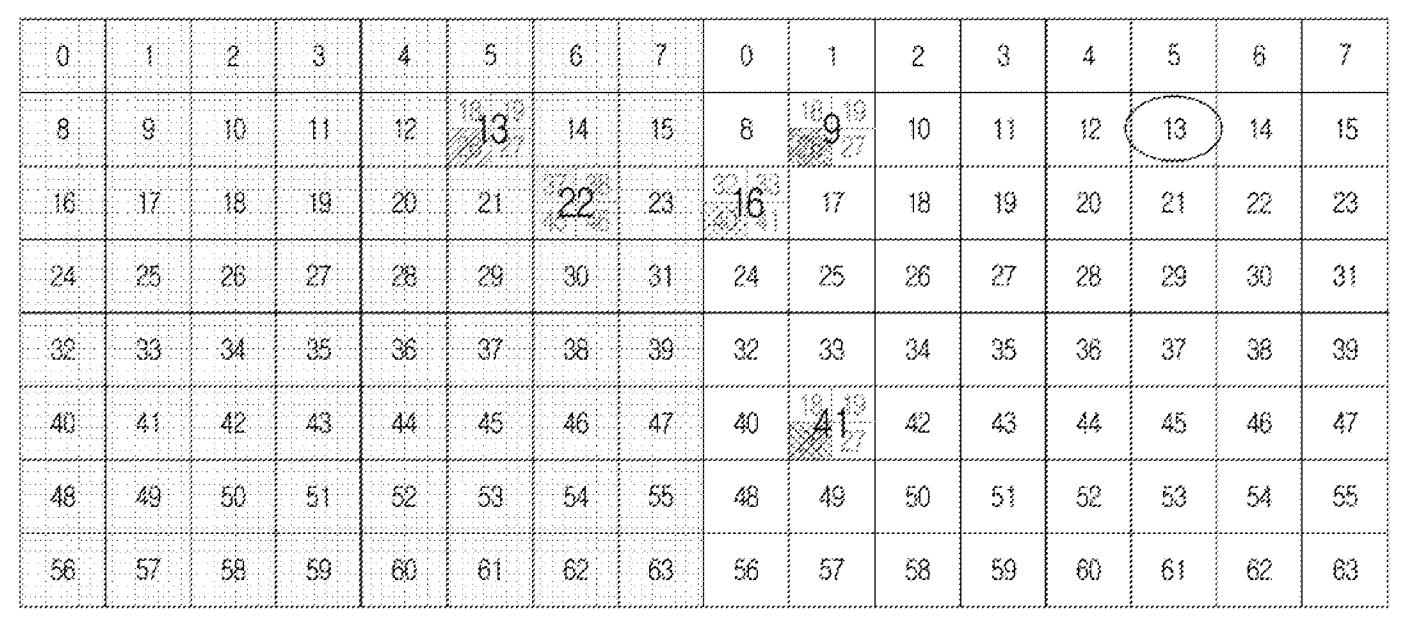

Herein, as an example, referring to FIG. 15, a cell radius and a terminal-to-terminal sidelink communication service radius may be different from each other. As a concrete example, when V2X communication is performed based on beamforming of mmWave, the difference between a cell radius and a radius of a sidelink communication service may further increase. Herein, when a zone is set based on sidelink communication, an error may occur as a terminal determines a location of a base station through a zone ID of a cell. As an example, in FIG. 15, terminals, which perform sidelink communication based on the zone ID 26 of a base station, may not determine which zone ID the base station corresponds to.

As an example, there may be 2 or 3 zone IDs around a terminal, and it may be difficult to recognize which of the zone IDs corresponds to a base station. In consideration of what is described above, a base station may avoid confusion by calculating a zone ID based on a zone length, which is set to configure a zone set with a cell radius size, and delivering the zone ID to a terminal. In FIG. 15, when a zone length is doubled for a base station, the ID of the base station may be 13, and a terminal may recognize the ID. As an example, in FIG. 15, another ID of 13 is outside the cell radius, and corresponding terminals cannot detect the ID so that no confusion may occur and the zone ID of the base station may be recognized.

Figure 16:
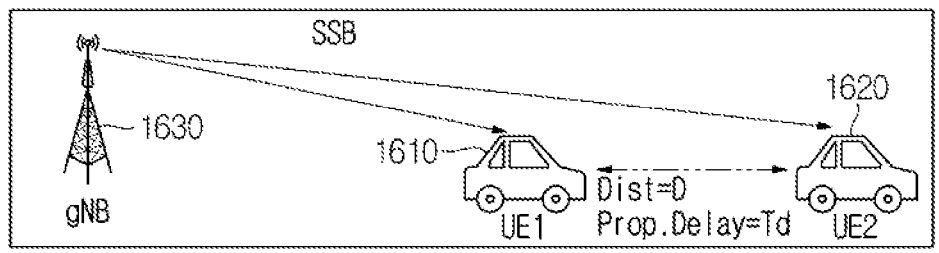
FIG. 16 is a view showing a method for synchronizing transmission times between terminals according to an embodiment of the present disclosure.
Figure 16:
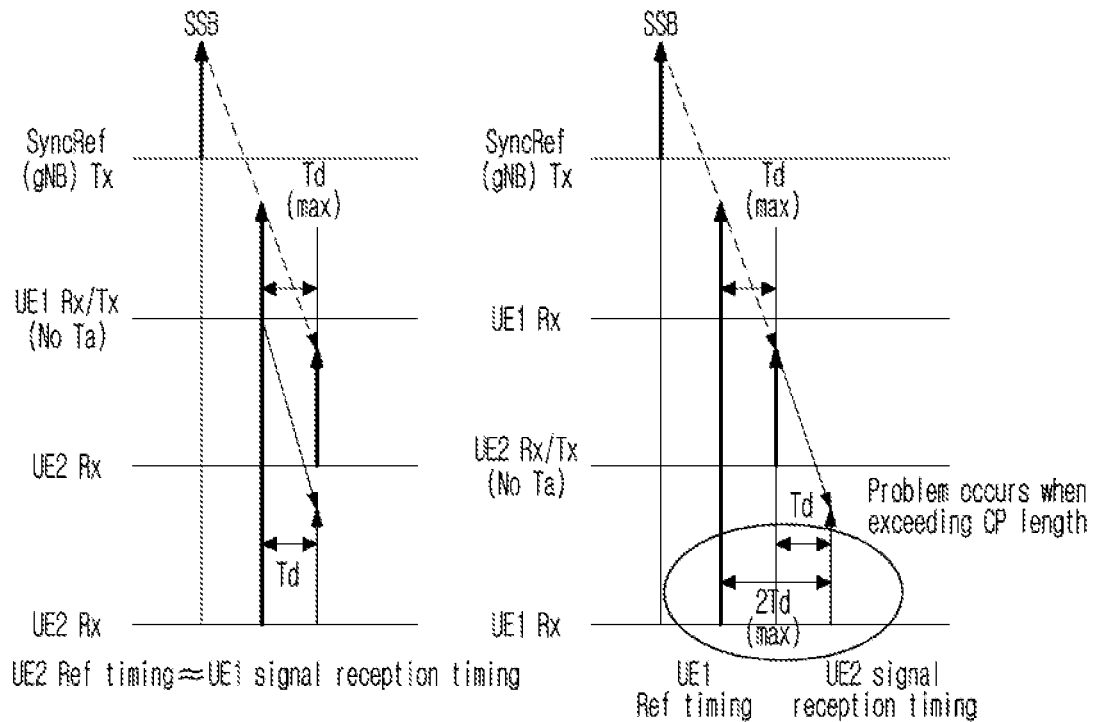

Then, referring to FIG. 16, it is possible to consider a case in which a delay becomes longer than a CP length based on a direction of a beam. As an example, in FIG. 16, a terminal 1 1610 and a terminal 2 1620 may receive a synchronization signal from a base station 1630, which is a synchronization reference source, and perform sidelink communication after synchronization. At this time, based on a relative location to the terminal 1 1610, the terminal 2 1620 may be at a long distance in a beam direction of the base station 1630. Accordingly, when the terminal 1 1610 transmits sidelink data to the terminal 2 1620, even if both the terminal 1 1610 and the terminal 2 1620 perform synchronization based on the base station 16230, a delay may be smaller than an offset based on a same direction.

That is, since a delay may not be longer than a CP length, no problem may occur to transmission. However, as an example, when the terminal 2 1620 transmits sidelink data to the terminal 1 1610, a delay occurring based on synchronization timing of the terminal 1 1610 and synchronization timing of the terminal 2 1620 may be longer than a CP length. As an example, the synchronization timing of the terminal 1 1610, which is located before the terminal 2 1620 in the direction of the base station 1630, may be earlier than that of the terminal 2 1620. Accordingly, when the terminal 2 1620, which is located relatively behind, transmits sidelink data based on its synchronization timing, a delay of 2Td may occur as shown in FIG. 16, and the delay may become longer than a CP length so that signal reception can be problematic. That is, a problem may occur to sidelink communication based on a beam direction of the base station 1630. In consideration of what is described above, the base station 1630 may deliver zone ID information to the terminal 1 1610 and the terminal 2 1620. Herein, each terminal may identify relative location information to the base station 1630 based on zone ID information and set a timing offset for changing transmission timing (time advance) based on the zone ID. As another example, a reception terminal, which receives data based on sidelink communication, may control a signal sent by a transmission terminal to be within a CP by controlling reception timing, and thus the problem of a delay longer than a CP may be solved.

Figure 17:
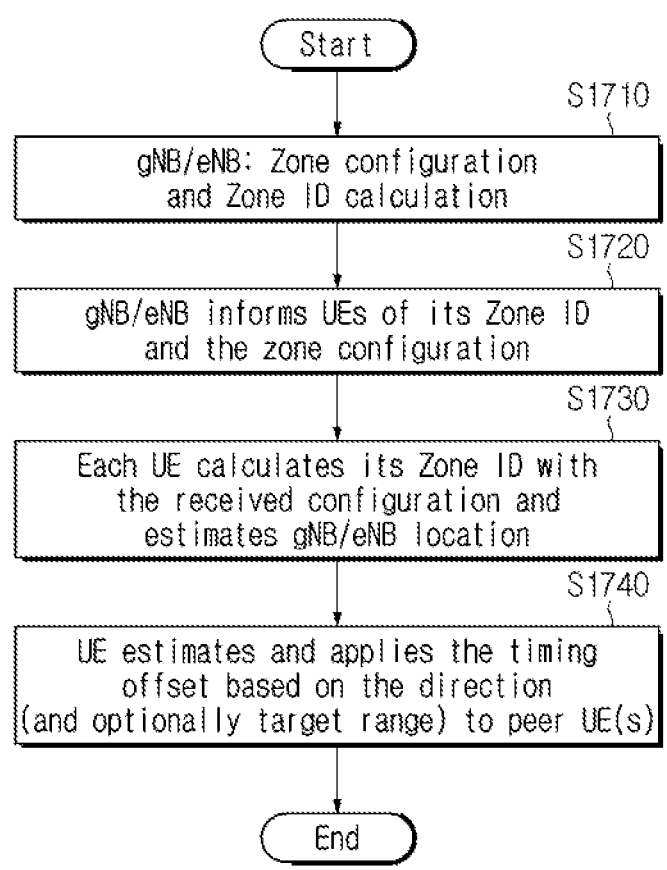
FIG. 17 is a view showing a method for applying a timing offset for sidelink communication according to an embodiment of the present disclosure.

In consideration of what is described above, referring to FIG. 17, a base station may calculate a zone ID based on zone configuration information (S1710). Herein, a zone block may be set to be larger than a cell radius, and thus a location of the base station may be prevented from being confused. Next, based on the location of the base station, the base station may transmit the zone ID and the zone configuration information to terminals performing sidelink communication (S1720). At this time, each of the terminals may operation in a mode of identifying a synchronization reference source based on a base station. As an example, each of the terminals may determine its timing based on a base station. As an example, a zone ID and zone configuration information, which are transmitted by the base station, may be transmitted to the terminals based on at least one of a system information block for sidelink communication and a designated RRC message and are not limited to a specific embodiment. In addition, as an example, the base station may transmit additional zone configuration information for sidelink communication to the terminals, but the present disclosure is not limited to the above-described embodiment.

Next, each of the terminals may estimate a relative location of the base station based on the zone ID received from the base station (S1730). Next, the terminals may estimate a timing offset by considering a location of the base station and a direction relative to a counterpart terminal based on a relative location of the base station and perform sidelink communication by applying the timing offset (S1740). Herein, the base station may transmit a synchronization signal through beamforming based on mmWave, and each of the terminals receiving the synchronization signal may estimate and apply a timing offset by a direction of a counterpart terminal. Thus, the problem of a delay longer than a CP may be prevented in sidelink communication.

Figure 18:
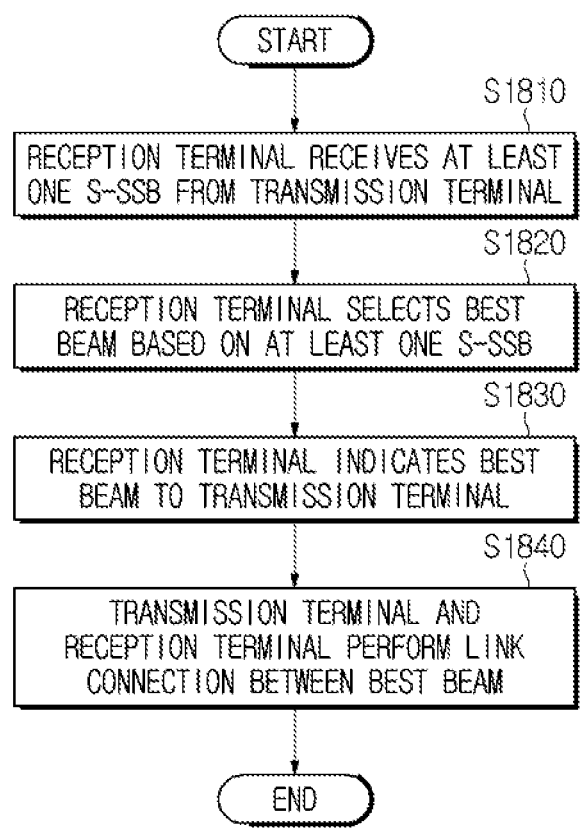
FIG. 18 is a flowchart showing a method for configuring a zone ID and a block ID according to an embodiment of the present disclosure.

FIG. 18 is a view showing a method of exchanging location information between terminals by using a zone ID and a block ID according to an embodiment of the present disclosure. Referring to FIG. 18, 3 zone IDs may be set based on a single block (S1810). As an example, like in the above-described table 3, zone IDs of 0 to 4095 may be set based on a single block, and a location of a terminal may be indicated through the zone IDs. In addition, as an example, a block ID as well as a zone ID may be configured based on the above-described block (S1820). Herein, a terminal may deliver location information by transmitting the configured zone ID and block ID to another terminal (S1830). As an example, since there is an overlap of zone ID allocated to each block, a same zone ID may exist in different blocks. Herein, when a terminal identifies location information based on a zone ID, there may be confusion regarding whether the zone ID is located in a same block or in different blocks. In consideration of what is described above, a block ID may be added to a block. As an example, a block ID may be configured by 2 bits or 3 bits. As another example, when a block has a sufficiently large size, there may be no confusion of zone ID so that a block ID may be disabled, which may be the same as described in FIG. 10 and FIG. 11.

Figure 19:
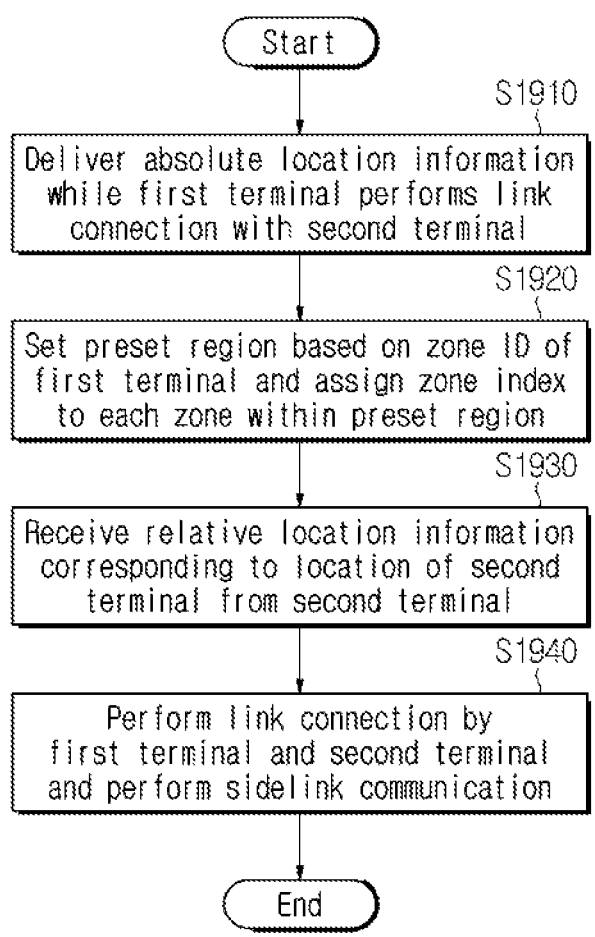
FIG. 19 is a flowchart showing a method for configuring absolute location information and relative location information according to an embodiment of the present disclosure.

FIG. 19 is a view showing a method of delivering absolute location information and relative location information according to an embodiment of the present disclosure. As an example, referring to FIG. 19, a first terminal may deliver absolute location information to a second terminal, while performing link connection with the second terminal (S1910). Herein, the absolute location information may be information based on a zone ID of the first terminal. Herein, the first terminal may set a preset region in a location of the first terminal based on the zone ID and assign a new zone index to each zone within the preset region (S1920). Next, the second terminal, which receives the absolute location information from the first terminal, may identify a zone index corresponding to a location of the second terminal and transmit index information of a zone as relative location information to the first terminal (S1930). Next, the first terminal and the second terminal may perform link connection and execute sidelink communication. Herein, as an example, when the location of the first terminal is changed, the first terminal may set a preset region based on a zone ID of the first terminal and assign a zone index at a time of transmitting the absolute location information to the second terminal. Next, the first terminal may transmit index information of a zone corresponding to the changed location of the first terminal to the second terminal. In addition, as an example, when a location of the second terminal is changed, the second terminal may set a preset region, based on the location of the second terminal at a time of transmitting relative location information to the first terminal, assign a zone index for each zone within the preset region, and transmit index information of a zone corresponding to the changed location of the second terminal as relative location information to the first terminal. That is, the first terminal and the second terminal may transmit relative location information, which has been changed from a previous location, to another terminal. Herein, as an example, a size of the preset region described above may be determined based on at least one of a channel environment and a travel speed of terminals.

In addition, as an example, each terminal may selectively transmit absolute location information and relative location information. As an example, when the location of the second terminal is located within a preset region based on absolute location information of the first terminal, the second terminal may transmit relative location information to the first terminal. On the other hand, when the location of the second terminal is outside a preset region, the second terminal may transmit absolute location information to the first terminal based on a zone ID of the second terminal, which is the same as descried above. In addition, as an example, a format of absolute location information and a format of relative location information may be set to be the same. As an example, the format may include an indicator for identifying absolute location information and relative location information, which is the same as described above.

In addition, as an example, a format of absolute location information and a format of relative location information may be set differently. As an example, absolute location information may be transmitted based on SCI, and relative location information may be transmitted based on MAC CE, which is the same as described above.

In addition, as an example, a time for each of the terminals to transmit changed location information may be a time when a location is changed. In addition, as an example, a time for each of the terminals to transmit changed location information may be a time based on a preset cycle or a time based on a preset condition, which is the same as described above.

Systems and Various Devices to which Embodiments of the Present Disclosure are Applicable Various embodiments of the present disclosure may be mutually combined.

Hereinafter, an apparatus to which various embodiments of the present disclosure is applicable will be described. Although not limited thereto, various descriptions, functions, procedures, proposals, methods, and/or flowcharts disclosed herein may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 20:
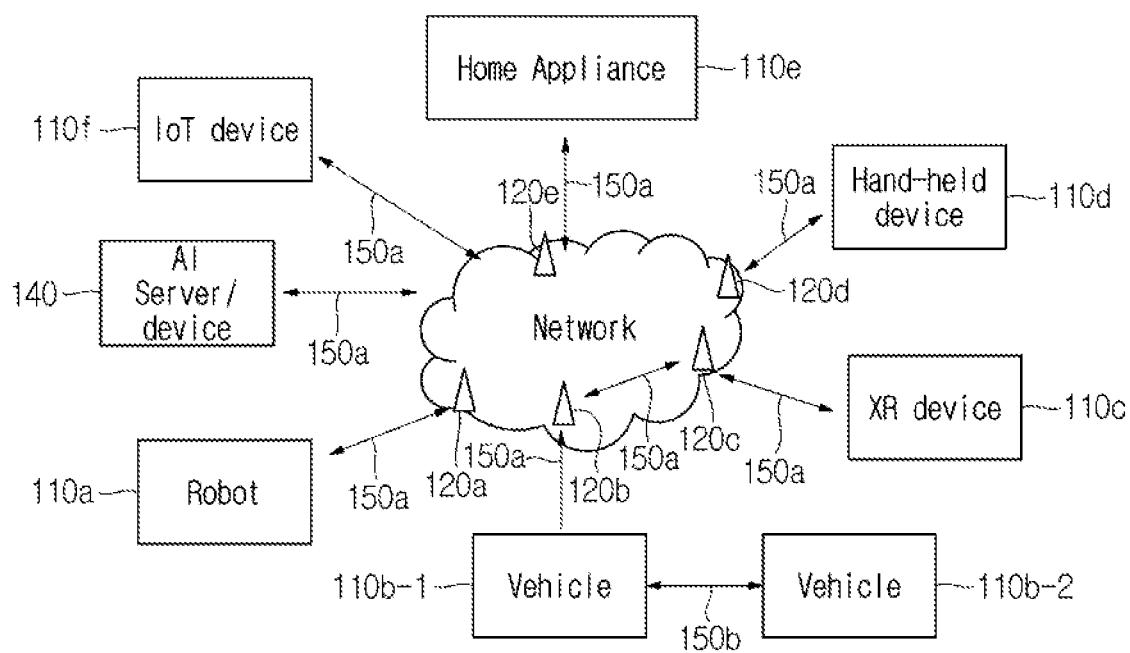
FIG. 20 illustrates an example of a communication system according to an embodiment of the present disclosure.

FIG. 20 illustrates a communication system according to an embodiment of the present disclosure. The embodiment of FIG. 20 may be combined with various embodiments of the present disclosure.

Referring to FIG. 20, the communication system applicable to the present disclosure includes a wireless device, a base station and a network. The wireless device refers to a device for performing communication using radio access technology (e.g., 5G NR or LTE) and may be referred to as a communication/wireless/5G device. Without being limited thereto, the wireless device may include at least one of a robot 100a, vehicles 100b-1 and 100b-2, an extended reality (XR) device 100c, a hand-held device 100d, a home appliance 100e, an Internet of Thing (IoT) device 100f, and an artificial intelligence (AI) device/server 100g. For example, the vehicles may include a vehicle having a wireless communication function, an autonomous vehicle, a vehicle capable of performing vehicle-to-vehicle communication, etc. The vehicles 100b-1 and 100b-2 may include an unmanned aerial vehicle (UAV) (e.g., a drone). The XR device 100c includes an augmented reality (AR)/virtual reality (VR)/mixed reality (MR) device and may be implemented in the form of a head-mounted device (HMD), a head-up display (HUD) provided in a vehicle, a television, a smartphone, a computer, a wearable device, a home appliance, a digital signage, a vehicle or a robot. The hand-held device 100d may include a smartphone, a smart pad, a wearable device (e.g., a smart watch or smart glasses), a computer (e.g., a laptop), etc. The home appliance 100e may include a TV, a refrigerator, a washing machine, etc. The IoT device 100f may include a sensor, a smart meter, etc. For example, the base station 120a to 120e network may be implemented by a wireless device, and a specific wireless device 120a may operate as a base station/network node for another wireless device.

Here, the wireless communication technology implemented in the wireless devices 110a to 110f of the present specification may include a narrowband Internet of Things for low-power communication as well as LTE, NR, and 6G. At this time, for example, NB-IoT technology may be an example of LPWAN (Low Power Wide Area Network) technology, may be implemented in standards such as LTE Cat NB1 and/or LTE Cat NB2, and is not limited to the above-described names. Additionally or alternatively, the wireless communication technology implemented in the wireless devices 110a to 110f of the present specification may perform communication based on LTE-M technology. In this case, as an example, the LTE-M technology may be an example of an LPWAN technology, and may be called by various names such as enhanced machine type communication (eMTC). For example, LTE-M technology may be implemented in at least one of 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 110a to 110f of the present specification may include at least one of ZigBee, Bluetooth, and Low Power Wide Area Network (LPWAN) in consideration of low power communication, and is not limited to the above-described names. For example, the ZigBee technology may create PAN (personal area networks) related to small/low-power digital communication based on various standards such as IEEE 802.15.4, and may be called by various names.

The wireless devices 100a to 100f may be connected to the network through the base station 120. AI technology is applicable to the wireless devices 100a to 100f, and the wireless devices 100a to 100f may be connected to the AI server 100g through the network. The network may be configured using a 3G network, a 4G (e.g., LTE) network or a 5G (e.g., NR) network, etc. The wireless devices 100a to 100f may communicate with each other through the base stations 120a to 120e or perform direct communication (e.g., sidelink communication) without through the base stations 120a to 120e. For example, the vehicles 100b-1 and 100b-2 may perform direct communication (e.g., vehicle to vehicle (V2V)/vehicle to everything (V2X) communication). In addition, the IoT device 100f (e.g., a sensor) may perform direct communication with another IoT device (e.g., a sensor) or the other wireless devices 100a to 100f.

Wireless communications/connections 150a, 150b and 150c may be established between the wireless devices 100a to 100f/the base stations 120a to 120e and the base stations 120a to 120e/the base stations 120a to 120e. Here, wireless communication/connection may be established through various radio access technologies (e.g., 5G NR) such as uplink/downlink communication 150a, sidelink communication 150b (or D2D communication) or communication 150c between base stations (e.g., relay, integrated access backhaul (IAB). The wireless device and the base station/wireless device or the base station and the base station may transmit/receive radio signals to/from each other through wireless communication/connection 150a, 150b and 150c. For example, wireless communication/connection 150a, 150b and 150c may enable signal transmission/reception through various physical channels. To this end, based on the various proposals of the present disclosure, at least some of various configuration information setting processes for transmission/reception of radio signals, various signal processing procedures (e.g., channel encoding/decoding, modulation/demodulation, resource mapping/demapping, etc.), resource allocation processes, etc. may be performed.

Figure 21:
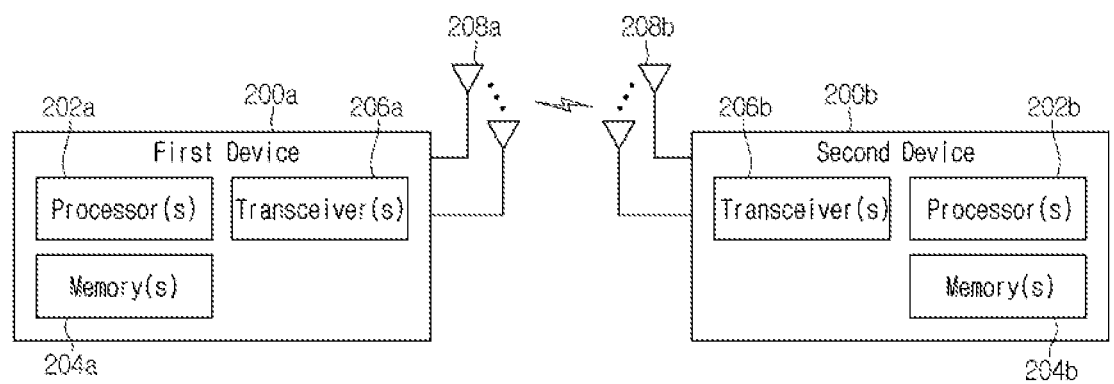
FIG. 21 illustrates an example of a wireless device according to an embodiment of the present disclosure.

FIG. 21 illustrates a wireless device according to an embodiment of the present disclosure. The embodiment of FIG. 21 may be combined with various embodiments of the present disclosure.

Referring to FIG. 21, a first wireless device 200a and a second wireless device 200b may transmit and receive radio signals through various radio access technologies (e.g., LTE or NR). Here, {the first wireless device 200a, the second wireless device 200b} may correspond to {the wireless device 100x, the base station 120} and/or {the wireless device 100x, the wireless device 100x} of FIG. 1.

The first wireless device 200a may include one or more processors 202a and one or more memories 204a and may further include one or more transceivers 206a and/or one or more antennas 208a. The processor 202a may be configured to control the memory 204a and/or the transceiver 206a and to implement descriptions, functions, procedures, proposals, methods and/or operational flowcharts disclosed herein. For example, the processor 202a may process information in the memory 204a to generate first information/signal and then transmit a radio signal including the first information/signal through the transceiver 206a. In addition, the processor 202a may receive a radio signal including second information/signal through the transceiver 206a and then store information obtained from signal processing of the second information/signal in the memory 204a. The memory 204a may be coupled with the processor 202a, and store a variety of information related to operation of the processor 202a. For example, the memory 204a may store software code including instructions for performing all or some of the processes controlled by the processor 202a or performing the descriptions, functions, procedures, proposals, methods and/or operational flowcharts disclosed herein. Here, the processor 202a and the memory 204a may be part of a communication modem/circuit/chip designed to implement wireless communication technology (e.g., LTE or NR). The transceiver 206a may be coupled with the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may refer to a communication modem/circuit/chip.

The second wireless device 200b may perform wireless communications with the first wireless device 200a and may include one or more processors 202b and one or more memories 204b and may further include one or more transceivers 206b and/or one or more antennas 208b. The functions of one or more processors 202b, one or more memories 204b, one or more transceivers 206b, and/or one or more antennas 208b may be similar to those of one or more processors 202a, one or more memories 204a, one or more transceivers 206a and/or one or more antennas 208a of the first wireless device 200a.

Hereinafter, hardware elements of the wireless devices 200a and 200b will be described in greater detail. Without being limited thereto, one or more protocol layers may be implemented by one or more processors 202a and 202b. For example, one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). One or more processors 202a and 202b may generate one or more protocol data units (PDUs), one or more service data unit (SDU), messages, control information, data or information according to the descriptions, functions, procedures, proposals, methods and/or operational flowcharts disclosed herein. One or more processors 202a and 202b may generate PDUs, SDUs, messages, control information, data or information according to the functions, procedures, proposals and/or methods disclosed herein and provide the PDUs, SDUs, messages, control information, data or information to one or more transceivers 206a and 206b. One or more processors 202a and 202b may receive signals (e.g., baseband signals) from one or more transceivers 206a and 206b and acquire PDUs, SDUs, messages, control information, data or information according to the descriptions, functions, procedures, proposals, methods and/or operational flowcharts disclosed herein.

One or more processors 202a and 202b may be referred to as controllers, microcontrollers, microprocessors or microcomputers. One or more processors 202a and 202b may be implemented by hardware, firmware, software or a combination thereof. For example, one or more application specific integrated circuits (ASICs), one or more digital signal processors (DSPs), one or more digital signal processing devices (DSPDs), programmable logic devices (PLDs) or one or more field programmable gate arrays (FPGAs) may be included in one or more processors 202a and 202b. The descriptions, functions, procedures, proposals, methods and/or operational flowcharts disclosed herein may be implemented using firmware or software, and firmware or software may be implemented to include modules, procedures, functions, etc. Firmware or software configured to perform the descriptions, functions, procedures, proposals, methods and/or operational flowcharts disclosed herein may be included in one or more processors 202a and 202b or stored in one or more memories 204a and 204b to be driven by one or more processors 202a and 202b. The descriptions, functions, procedures, proposals, methods and/or operational flowcharts disclosed herein implemented using firmware or software in the form of code, a command and/or a set of commands.

One or more memories 204a and 204b may be coupled with one or more processors 202a and 202b to store various types of data, signals, messages, information, programs, code, instructions and/or commands. One or more memories 204a and 204b may be composed of read only memories (ROMs), random access memories (RAMs), erasable programmable read only memories (EPROMs), flash memories, hard drives, registers, cache memories, computer-readable storage mediums and/or combinations thereof. One or more memories 204a and 204b may be located inside and/or outside one or more processors 202a and 202b. In addition, one or more memories 204a and 204b may be coupled with one or more processors 202a and 202b through various technologies such as wired or wireless connection.

One or more transceivers 206a and 206b may transmit user data, control information, radio signals/channels, etc. described in the methods and/or operational flowcharts of the present disclosure to one or more other apparatuses. One or more transceivers 206a and 206b may receive user data, control information, radio signals/channels, etc. described in the methods and/or operational flowcharts of the present disclosure from one or more other apparatuses. In addition, one or more transceivers 206a and 206b may be coupled with one or more antennas 208a and 208b, and may be configured to transmit/receive user data, control information, radio signals/channels, etc. described in the descriptions, functions, procedures, proposals, methods and/or operational flowcharts disclosed herein through one or more antennas 208a and 208b. In the present disclosure, one or more antennas may be a plurality of physical antennas or a plurality of logical antennas (e.g., antenna ports). One or more transceivers 206a and 206b may convert the received radio signals/channels, etc. from RF band signals to baseband signals, in order to process the received user data, control information, radio signals/channels, etc. using one or more processors 202a and 202b. One or more transceivers 206a and 206b may convert the user data, control information, radio signals/channels processed using one or more processors 202a and 202b from baseband signals into RF band signals. To this end, one or more transceivers 206a and 206b may include (analog) oscillator and/or filters.

Figure 22:
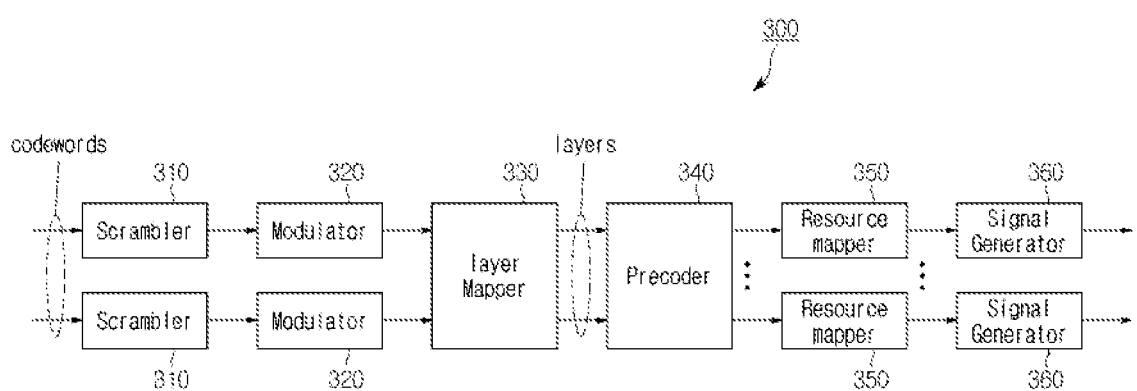
FIG. 22 illustrates a circuit of processing a transmission signal according to an embodiment of the present disclosure.

FIG. 22 illustrates a signal process circuit for a transmission signal applicable to the present disclosure. The embodiment of FIG. 22 may be combined with various embodiments of the present disclosure.

Referring to FIG. 22, a signal processing circuit 300 may include scramblers 310, modulators 320, a layer mapper 330, a precoder 340, resource mappers 350, and signal generators 360. For example, an operation/function of FIG. 22 may be performed by the processors 202a and 202b and/or the transceivers 206a and 206b of FIG. 21. Hardware elements of FIG. 22 may be implemented by the processors 202a and 202b and/or the transceivers 36 and 206 of FIG. 21. For example, blocks 310 to 360 may be implemented by the processors 202a and 202b of FIG. 21. Alternatively, the blocks 310 to 350 may be implemented by the processors 202a and 202b of FIG. 21 and the block 360 may be implemented by the transceivers 206a and 206b of FIG. 21, and it is not limited to the above-described embodiment.

Codewords may be converted into radio signals via the signal processing circuit 300 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH) of FIG. 22. Specifically, the codewords may be converted into scrambled bit sequences by the scramblers 310. Scramble sequences used for scrambling may be generated based on an initialization value, and the initialization value may include ID information of a wireless device. The scrambled bit sequences may be modulated to modulation symbol sequences by the modulators 320. A modulation scheme may include pi/2-Binary Phase Shift Keying (pi/2-BPSK), m-Phase Shift Keying (m-PSK), and m-Quadrature Amplitude Modulation (m-QAM).

Complex modulation symbol sequences may be mapped to one or more transport layers by the layer mapper 330. Modulation symbols of each transport layer may be mapped (precoded) to corresponding antenna port(s) by the precoder 340. Outputs z of the precoder 340 may be obtained by multiplying outputs y of the layer mapper 330 by an N*M precoding matrix W. Herein, N is the number of antenna ports and M is the number of transport layers. The precoder 340 may perform precoding after performing transform precoding (e.g., DFT) for complex modulation symbols. Alternatively, the precoder 340 may perform precoding without performing transform precoding.

The resource mappers 350 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 360 may generate radio signals from the mapped modulation symbols and the generated radio signals may be transmitted to other devices through each antenna. For this purpose, the signal generators 360 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures of FIG. 22. For example, the wireless devices (e.g., 200a and 200b of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
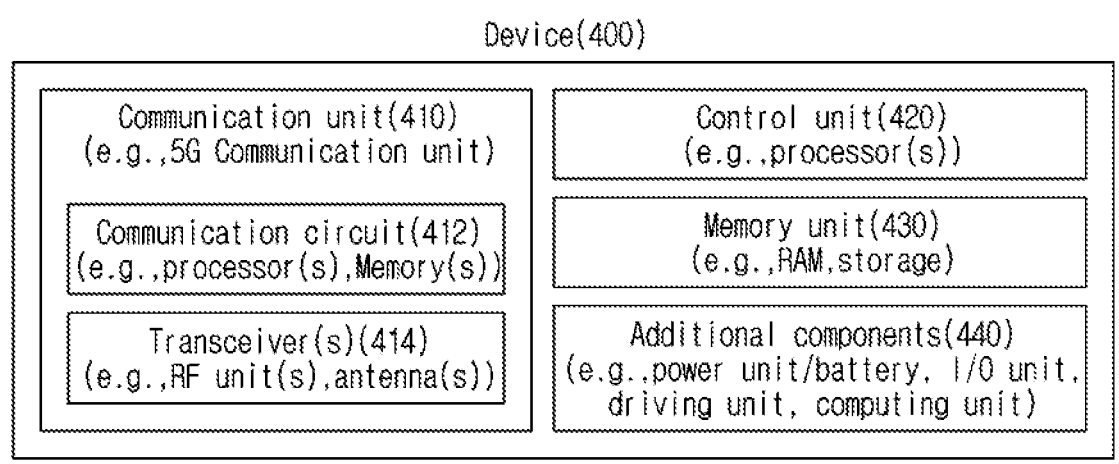
FIG. 23 illustrates another example of a wireless device according to an embodiment of the present disclosure.

FIG. 23 shows another example of a wireless device according to an embodiment of the present disclosure. FIG. 23 may be combined with various embodiments of the present disclosure.

Referring to FIG. 23, a wireless device 300 corresponds to the wireless devices 200a and 200b of FIG. 21, and may include various elements, components, units/portions, and/or modules. For example, the wireless device 400 may include a communication unit 410, a control unit 420, a memory unit 430, and an additional component 440.

The communication unit 410 may include a communication circuit 412 and transceiver(s) 414. The communication unit 410 may transmit and receive signals (e.g., data, control signals, etc.) to and from other wireless devices and base stations. For example, the communication circuit 412 may include one or more processors 202a and 202b and/or one or more memories 204a and 204b of FIG. 21. For example, the transceiver(s) 414 may include one or more transceivers 206a and 206b and/or one or more antennas 208a and 208b of FIG. 21.

The control unit 420 may be composed of a set of one or more processors. For example, the control unit 420 may include a set of a communication control processor, an application processor (AP), an electronic control unit (ECU), a graphic processing processor, a memory control processor, and the like. The control unit 420 is electrically connected to the communication unit 410, the memory unit 430, and the additional component 440, and controls general operations of the wireless device. For example, the controller 420 may control electrical/mechanical operation of the wireless device based on the program/code/command/information stored in the memory unit 430. In addition, the control unit 420 may transmit the information stored in the memory unit 430 to the outside (e.g., another communication device) through the communication unit 410 through a wireless/wired interface, or store, in the memory unit 430, information received from the outside (e.g., another communication device) through the communication unit 410 through a wireless/wired interface.

The memory unit 430 may be composed of a RAM, a DRAM (dynamic RAM), a ROM, a flash memory, a volatile memory, a non-volatile memory and/or a combination thereof. The memory unit 430 may store data/parameters/programs/codes/commands necessary to drive the wireless device 400. Also, the memory unit 430 may store input/output data/information.

The additional component 440 may be variously configured according to the type of the wireless device. For example, the additional component 440 may include at least one of a power unit/battery, an input/output unit, a driving unit, and a computing unit. Although not limited thereto, the wireless device 400 may be implemented in the form of a robot (FIGS. 1, 110*a*), a vehicle (FIGS. 1, 110*b*-1 and 110*b*-2), an XR device (FIGS. 1, 110*c*), and a mobile device (FIGS. 1, 110*d*), home appliance (FIGS. 1, 110*e*), an IoT device (FIGS. 1, 110*f*), a digital broadcasting terminal, a hologram device, a public safety device, an MTC device, a medical device, a fintech device (or financial device), a security device, a climate/environment device, an AI server/device (FIGS. 1, 140), a base station (FIGS. 1, 120), and a network node. The wireless device may be mobile or used in a fixed location according to the use-example/service.

Figure 24:
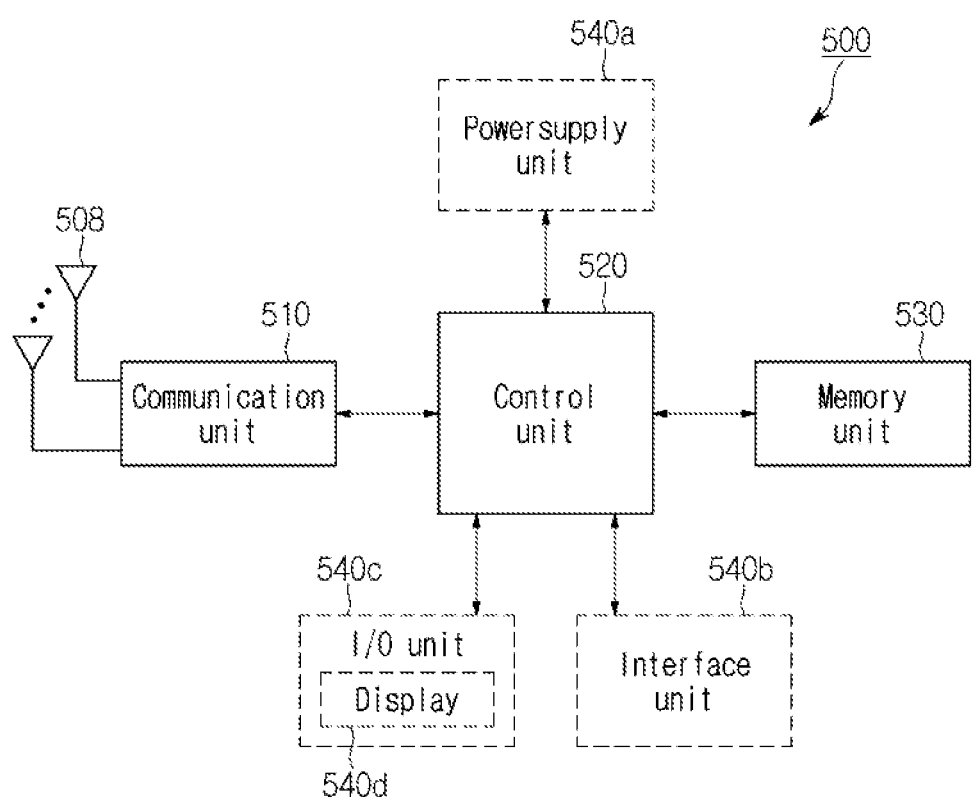
FIG. 24 illustrates an example of a portable device according to an embodiment of the present disclosure.

FIG. 24 illustrates a hand-held device applicable to the present disclosure. FIG. 24 exemplifies a hand-held device applicable to the present disclosure. The hand-held device may include a smartphone, a smart pad, a wearable device (e.g., a smart watch or smart glasses), and a hand-held computer (e.g., a laptop, etc.). The embodiment of FIG. 24 may be combined with various embodiments of the present disclosure.

Referring to FIG. 24, the hand-held device 500 may include an antenna unit (antenna) 508, a communication unit (transceiver) 510, a control unit (controller) 520, a memory unit (memory) 530, a power supply unit (power supply) 540*a*, an interface unit (interface) 540*b*, and an input/output unit 540*c*. An antenna unit (antenna) 508 may be part of the communication unit 510. The blocks 510 to 530/440*a* to 540*c* may correspond to the blocks 310 to 330/340 of FIG. 35, respectively, and duplicate descriptions are omitted.

The communication unit 510 may transmit and receive signals and the control unit 520 may control the hand-held device 500, and the memory unit 530 may store data and so on. The power supply unit 540*a* may supply power to the hand-held device 500 and include a wired/wireless charging circuit, a battery, etc. The interface unit 540*b* may support connection between the hand-held device 500 and another external device. The interface unit 540*b* may include various ports (e.g., an audio input/output port and a video input/output port) for connection with the external device. The input/output unit 540*c* may receive or output video information/signals, audio information/signals, data and/or user input information. The input/output unit 540*c* may include a camera, a microphone, a user input unit, a display 540*d*, a speaker and/or a haptic module.

For example, in case of data communication, the input/output unit 540*c* may acquire user input information/signal (e.g., touch, text, voice, image or video) from the user and store the user input information/signal in the memory unit 530. The communication unit 510 may convert the information/signal stored in the memory into a radio signal and transmit the converted radio signal to another wireless device directly or transmit the converted radio signal to a base station. In addition, the communication unit 510 may receive a radio signal from another wireless device or the base station and then restore the received radio signal into original information/signal. The restored information/signal may be stored in the memory unit 530 and then output through the input/output unit 540*c* in various forms (e.g., text, voice, image, video and haptic).

Figure 25:
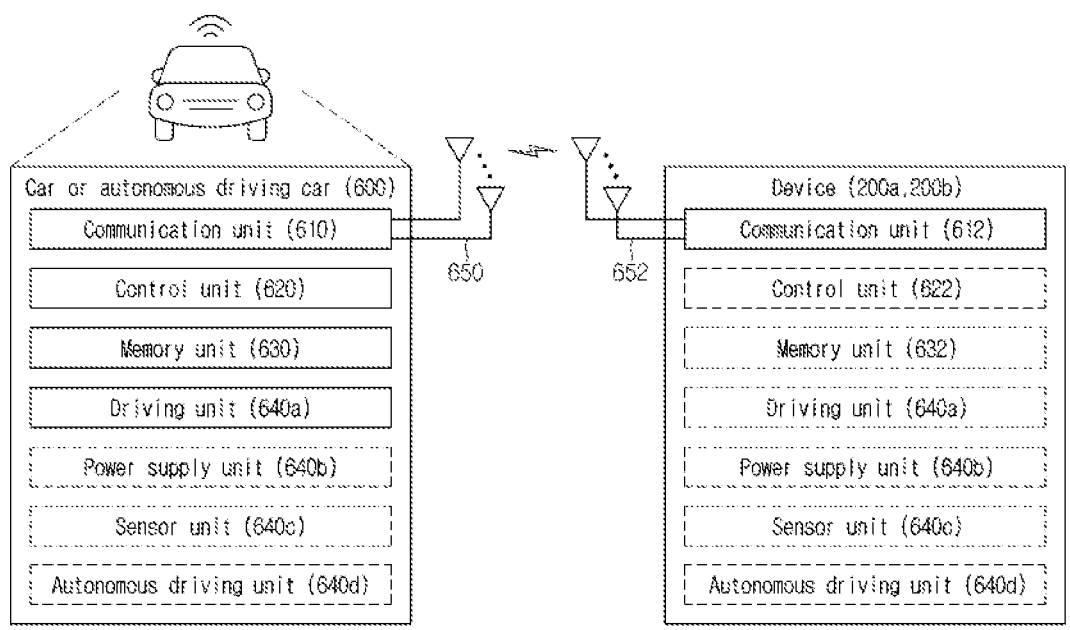
FIG. 25 illustrates an example of a vehicle or an autonomous vehicle according to an embodiment of the present disclosure.

FIG. 25 illustrates a car or an autonomous vehicle applicable to the present disclosure. FIG. 25 exemplifies a car or an autonomous driving vehicle applicable to the present disclosure. The car or the autonomous driving car may be implemented as a mobile robot, a vehicle, a train, a manned/unmanned aerial vehicle (AV), a ship, etc. and the type of the car is not limited. The embodiment of FIG. 25 may be combined with various embodiments of the present disclosure.

Referring to FIG. 25, the car or autonomous driving car 600 may include an antenna unit (antenna) 608, a communication unit (transceiver) 610, a control unit (controller) 620, a driving unit 640*a*, a power supply unit (power supply) 640*b*, a sensor unit 640*c*, and an autonomous driving unit 640*d*. The antenna unit 650 may be configured as part of the communication unit 610. The blocks 610/630/640*a* to 640*d* correspond to the blocks 510/530/540 of FIG. 24, and duplicate descriptions are omitted.

The communication unit 610 may transmit and receive signals (e.g., data, control signals, etc.) to and from external devices such as another vehicle, a base station (e.g., a base station, a road side unit, etc.), and a server. The control unit 620 may control the elements of the car or autonomous driving car 600 to perform various operations. The control unit 620 may include an electronic control unit (ECU). The driving unit 640*a* may drive the car or autonomous driving car 600 on the ground. The driving unit 640*a* may include an engine, a motor, a power train, wheels, a brake, a steering device, etc. The power supply unit 640*b* may supply power to the car or autonomous driving car 600, and include a wired/wireless charging circuit, a battery, etc. The sensor unit 640*c* may obtain a vehicle state, surrounding environment information, user information, etc. The sensor unit 640*c* may include an inertial navigation unit (IMU) sensor, a collision sensor, a wheel sensor, a speed sensor, an inclination sensor, a weight sensor, a heading sensor, a position module, a vehicle forward/reverse sensor, a battery sensor, a fuel sensor, a tire sensor, a steering sensor, a temperature sensor, a humidity sensor, an ultrasonic sensor, an illumination sensor, a brake pedal position sensor, and so on. The autonomous driving sensor 640*d* may implement technology for maintaining a driving lane, technology for automatically controlling a speed such as adaptive cruise control, technology for automatically driving the car along a predetermined route, technology for automatically setting a route when a destination is set and driving the car, etc.

For example, the communication unit 610 may receive map data, traffic information data, etc. from an external server. The autonomous driving unit 640*d* may generate an autonomous driving route and a driving plan based on the acquired data. The control unit 620 may control the driving unit 640*a* (e.g., speed/direction control) such that the car or autonomous driving car 600 moves along the autonomous driving route according to the driving plane. During autonomous driving, the communication unit 610 may aperiodically/periodically acquire latest traffic information data from an external server and acquire surrounding traffic information data from neighboring cars. In addition, during autonomous driving, the sensor unit 640c may acquire a vehicle state and surrounding environment information. The autonomous driving unit 640d may update the autonomous driving route and the driving plan based on newly acquired data/information. The communication unit 610 may transmit information such as a vehicle location, an autonomous driving route, a driving plan, etc. to the external server. The external server may predict traffic information data using AI technology or the like based on the information collected from the cars or autonomous driving cars and provide the predicted traffic information data to the cars or autonomous driving cars.

As an example, based on the above-described device of FIGS. 20 to 25, a device may be considered which includes at least one memory and at least one processor functionally coupled with the at least one memory. Herein, the at least one processor may deliver absolute location information, while a device performs link connection with another device, wherein the absolute location information is information that is calculated based on a zone ID of the device, set a preset region based on the zone ID, assign a zone index to each zone within the preset region, receive relative location information corresponding to a location of the another device from the another device, and perform sidelink communication, wherein the relative location information is index information of a zone in which the another device is located based on the assigned zone index, and the device performs link connection with the another device.

In addition, based on the above-described device of FIGS. 20 to 25, a non-transitory computer-readable medium storing at least one instruction may be considered. Herein, the at least one instruction executable by a processor is included, and the at least one instruction may control the processor to deliver absolute location information, while a device performs link connection with another device, wherein the absolute location information is information that is calculated based on a zone ID of the device, to set a preset region based on the zone ID, to assign a zone index to each zone within the preset region, to receive relative location information corresponding to a location of the another device from the another device, and to perform sidelink communication, wherein the relative location information is index information of a zone in which the another device is located based on the assigned zone index, and the device performs link connection with the another device.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered illustrative. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

What is claimed is:

1. A method for delivering location information by a first terminal of a wireless communication system, the method comprising:
    performing synchronization based on sidelink synchronization signal (SLSS), wherein the SLSS includes primary sidelink synchronization signal (PSSS) and secondary sidelink synchronization signal (SSSS);
    determining one or more resource pools, wherein the one or more resource pools are configured by a base station based on resource allocation mode 1 for sidelink communication, or the one or more resource pools are determined by the first terminal based on resource allocation mode 2 for sidelink communication, wherein a resource pool includes a plurality of contiguous frequency resources in a frequency domain, and a set of slots in a time domain;
    performing link connection with a second terminal, wherein absolute location information is delivered from the first terminal to the second terminal, and the absolute location information is information calculated based on a zone ID of the first terminal; and
    performing, by the first terminal and the second terminal, sidelink communication based on the link connection,
    wherein a preset region based on the zone ID of the first terminal and a zone index to each zone within the preset region is assigned, and relative location information corresponding to a location of the second terminal is received by the first terminal, and
    wherein the relative location information is index information of a zone in which the second terminal is located based on the assigned zone index.

2. The method of claim 1, wherein, based on a change in a location of the first terminal, the first terminal sets the preset region based on the zone ID of the first terminal at a time of transmitting the absolute location information to the second terminal, assigns the zone index, and transmits index information of a zone corresponding to a changed location of the first terminal to the second terminal.

3. The method of claim 1, wherein, based on a change in the location of the second terminal, the second terminal sets a preset region based on the location of the second terminal at a time of transmitting the relative location information to the first terminal, assigns a zone index to each zone within the preset region, and transmits, to the first terminal, index information of a zone, which corresponds to a changed location of the second terminal, as relative location information.

4. The method of claim 1, wherein a size of the preset region is determined based on at least one of a channel environment and a travel speed of the first terminal and the second terminal.

5. The method of claim 4, wherein, based on the location of the second terminal being within the preset region, the relative location information is transmitted to the first terminal, and
    wherein, based on the location of the second terminal being outside the preset region, the second terminal transmits absolute location information based on a zone ID of the second terminal to the first terminal.

6. The method of claim 5, wherein a format of the absolute location information and a format of the relative location information are set to be the same, and wherein the format includes an indicator for identifying the absolute location information and the relative location information.

7. The method of claim 5, wherein the format of the absolute location information and the format of the relative location information are set to be different, and
wherein the absolute location information is transmitted based on sidelink control information (SCI) and the relative location information is transmitted based on a medium access control (MAC) control element (CE).

8. The method of claim 1, wherein each of the first terminal and the second terminal transmits relative location information to another terminal based on information on a changed location at a time when a location is changed.

9. The method of claim 1, wherein relative location information of the first terminal, which is based on a changed location of the first terminal, and relative location information of the second terminal, which is based on a changed location of the second terminal, are transmitted to another terminal based on a preset cycle.

10. The method of claim 1, wherein the absolute location information and the relative location information are configured by 12 bits,
wherein the relative location information includes a bit based on a zone index and a reserved bit, and
wherein a zone sub-index is allocated to the reserved bit.

11. The method of claim 1, wherein the absolute location information further includes a block ID.

12. The method of claim 11, wherein the block ID is determined based on a size of a block for which the zone ID is configured,
wherein, based on the size of the block being smaller than a first threshold, the block ID is configured by 3 bits,
wherein, based on the size of the block being larger than the first threshold and smaller than a second threshold, the block ID is configured by 2 bits, and
wherein, based on the size of the block being larger than the second threshold, the block ID is disabled.

13. The method of claim 1, wherein the absolute location information further includes a zone ID and a sub-zone ID indicating information located within a zone corresponding to the zone ID.

14. A terminal delivering location information in a wireless communication system, the terminal comprising:
a transceiver; and
a processor coupled with the transceiver,
wherein the processor is configured to:
perform synchronization based on sidelink synchronization signal (SLSS), wherein the SLSS includes primary sidelink synchronization signal (PSSS) and secondary sidelink synchronization signal (SSSS),
determine one or more resource pools, wherein the one or more resource pools are configured by a base station based on resource allocation mode 1 for sidelink communication, or the one or more resource pools are determined by the terminal based on resource allocation mode 2 for sidelink communication, wherein a resource pool includes a plurality of contiguous frequency resources in a frequency domain, and a set of slots in a time domain,
perform link connection with another terminal, wherein absolute location information is delivered from the terminal to the another terminal, and the absolute location information is information calculated based on a zone ID of the terminal, and
perform sidelink communication with the another terminal based on the link connection,
wherein a preset region based on the zone ID of the terminal and a zone index to each zone within the preset region is assigned to the terminal, and relative location information corresponding to a location of the another terminal is received by the terminal, wherein the relative location information is index information of a zone in which the another terminal is located based on the assigned zone index.

15. A terminal receiving location information in a wireless communication system, the terminal comprising:
a transceiver; and
a processor coupled with the transceiver,
wherein the processor is configured to:
perform synchronization based on sidelink synchronization signal (SLSS), wherein the SLSS includes primary sidelink synchronization signal (PSSS) and secondary sidelink synchronization signal (SSSS),
determine one or more resource pools, wherein the one or more resource pools are configured by a base station based on resource allocation mode 1 for sidelink communication, or the one or more resource pools are determined by another terminal based on resource allocation mode 2 for sidelink communication, wherein a resource pool includes a plurality of contiguous frequency resources in a frequency domain, and a set of slots in a time domain,
perform link connection with the another terminal, wherein absolute location information is received by the terminal, and the absolute location information is information calculated based on a zone ID of the terminal, and
perform sidelink communication with the another terminal based on the link connection,
wherein a preset region based on the zone ID of the another terminal and a zone index to each zone within the preset region is assigned to the terminal, and relative location information corresponding to a location of the terminal is transmitted to the another terminal, wherein the relative location information is index information of a zone in which the another terminal is located based on the assigned zone index.

* * * * *